(12) United States Patent
Takeuchi et al.

(10) Patent No.: US 8,564,170 B2
(45) Date of Patent: Oct. 22, 2013

(54) VIBRATION POWER GENERATOR, VIBRATION POWER GENERATION APPARATUS, AND ELECTRIC DEVICE AND COMMUNICATION DEVICE WITH VIBRATION POWER GENERATION APPARATUS MOUNTED THEREON

(75) Inventors: Hiroki Takeuchi, Osaka (JP); Hiroshi Nakatsuka, Osaka (JP); Keiji Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/806,890

(22) PCT Filed: May 31, 2012

(86) PCT No.: PCT/JP2012/003591
§ 371 (c)(1), (2), (4) Date: Dec. 26, 2012

(87) PCT Pub. No.: WO2012/164943
PCT Pub. Date: Dec. 6, 2012

(65) Prior Publication Data
US 2013/0099626 A1    Apr. 25, 2013

(30) Foreign Application Priority Data
Jun. 1, 2011   (JP) .................................. 2011-123297

(51) Int. Cl.
*H02N 1/00*    (2006.01)

(52) U.S. Cl.
USPC ........................................................ 310/309

(58) Field of Classification Search
CPC .......... H02N 1/00; H02N 1/002; H02N 1/004
USPC ................... 310/309, 300; 322/2 A; 318/116; 200/181

IPC ................................................ H02N 1/00,1/08
See application file for complete search history.

(56) References Cited

U.S. PATENT DOCUMENTS

| 8,018,119 B2 * | 9/2011 | Matsubara et al. ........... 310/309 |
| 2004/0007877 A1 | 1/2004 | Boland et al. |

(Continued)

FOREIGN PATENT DOCUMENTS

| CN | 201345622 | 11/2009 |
| JP | 4-236172  | 8/1992  |

(Continued)

OTHER PUBLICATIONS

USPTO Translation, JP 04-236172, Spacing Holding Device Using Electrostatic Force or Magnetic Force, Aug. 25, 1992.*

(Continued)

*Primary Examiner* — Tran Nguyen
*Assistant Examiner* — Thomas Truong
(74) *Attorney, Agent, or Firm* — Wenderoth, Lind & Ponack, L.L.P.

(57) ABSTRACT

A power generator comprises a first substrate 102, a second substrate 103 opposed to the first substrate, first electrodes 104L and 104R and a first electrode 106 which are formed on the first substrate, second electrodes 105L and 105R and a second electrode 107 which are formed on the second substrate, wherein electric charge of the same polarity is held by the first electrode and the second electrode, and the first substrate vibrates such that an angle formed between a segment connecting a centroid of the first electrode 104L (104R) and a centroid of the second electrode 105L (105R), and a half line extending from the centroid of the second electrode 105L (105R) toward the first electrode 104L (104R) in a stationary state in parallel to the main surface of the second substrate does not exceed 55 degrees while the first substrate 102 is stationary and vibrates.

11 Claims, 25 Drawing Sheets

(56) References Cited

U.S. PATENT DOCUMENTS

| | | |
|---|---|---|
| 2004/0016120 A1 | 1/2004 | Boland et al. |
| 2009/0058224 A1 | 3/2009 | Murayama et al. |
| 2009/0079295 A1 | 3/2009 | Naruse et al. |
| 2010/0079031 A1 | 4/2010 | Murayama et al. |
| 2013/0099626 A1* | 4/2013 | Takeuchi et al. ............ 310/300 |

FOREIGN PATENT DOCUMENTS

| | | |
|---|---|---|
| JP | 2005-529574 | 9/2005 |
| JP | 2007-312551 | 11/2007 |
| JP | 2008-278607 | 11/2008 |
| JP | 2009-55736 | 3/2009 |
| JP | 2009-81950 | 4/2009 |
| JP | 2009-95181 | 4/2009 |

OTHER PUBLICATIONS

International Search Report issued Aug. 21, 2012 in International (PCT) Application No. PCT/JP2012/003591.

Written Opinion of the International Searching Authority issued Aug. 21, 2012 in International (PCT) Application No. PCT/JP2012/003591.

Takumi Tsutsumino et al. "Seismic Power Generator Using High-Performance Polymer Electret", IEEE Int. Conf. MEMS 2006, Istanbul, (2006), pp. 98-101 (see p. 1, and Fig. 1).

Chinese Office Action issued Aug. 7, 2013 in corresponding Chinese Application No. 201280001754.8.

* cited by examiner

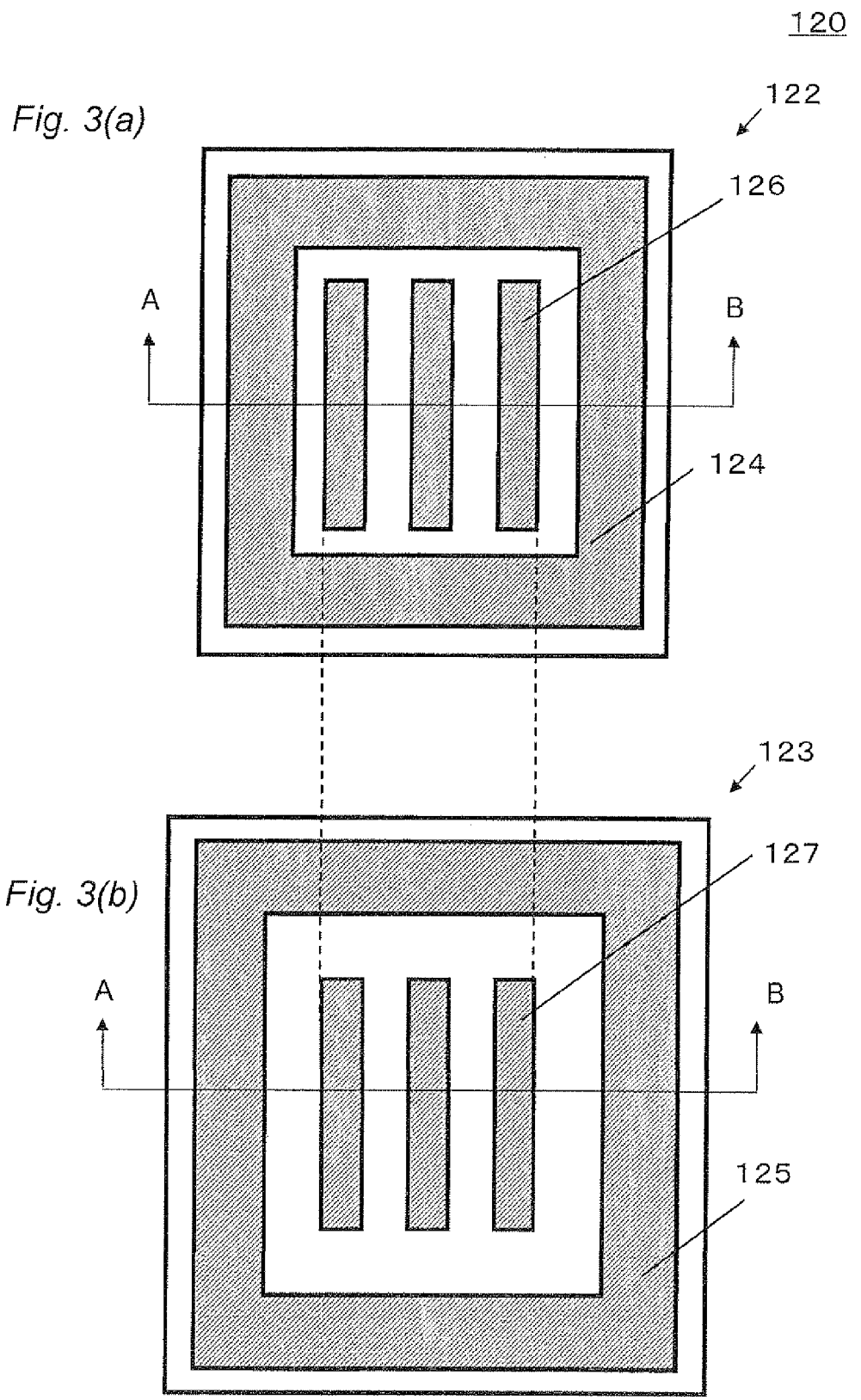

Fig. 15
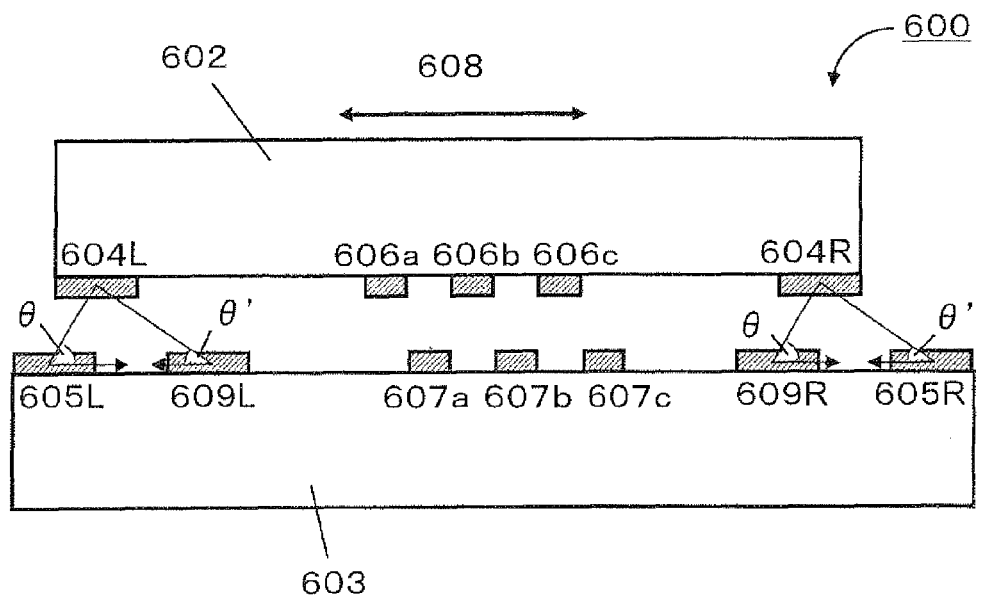
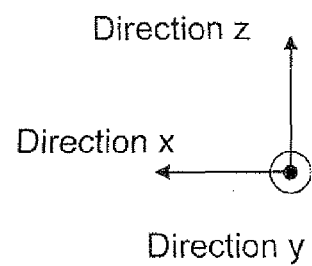

VIBRATION POWER GENERATOR, VIBRATION POWER GENERATION APPARATUS, AND ELECTRIC DEVICE AND COMMUNICATION DEVICE WITH VIBRATION POWER GENERATION APPARATUS MOUNTED THEREON

TECHNICAL FIELD

The present invention relates to vibration power generators, and more specifically, to an electrostatic vibration power generator using an electret.

BACKGROUND ART

As a conventional vibration power generator, an electrostatic induction vibration power generation apparatus is known in which an electric charge is applied to one electrode of a variable capacity and the electric charge is induced to another opposed electrode through electrostatic induction. The electric charge to be induced is varied by changing of the capacity. The electrostatic vibration power generation apparatus serves to generate power by taking out the change in the electric charge as electric energy (see Patent Document 1).

FIG. 24 is a schematic cross-sectional view showing a conventional electrostatic vibration power generator disclosed in Patent Document 1, specifically, a vibration power generator 10 using electret material.

The vibration power generator 10 includes a first substrate 11 with a plurality of conductive surface regions 13, and a second substrate 16 with a plurality of electret material regions 15. The first substrate 11 and the second substrate 16 are spaced apart from each other by a predetermined distance such that the conductive surface regions 13 are opposed to the electret material regions 15. The second substrate 16 is fixed, and the first substrate 11 is coupled to fixed structures 17 via springs 19. The spring 19 is connected to each of both sides of the first substrate 11, and to the fixed structure 17. Even when the first substrate 11 is displaced by an external force, the spring 19 applies a restoring force to the substrate toward its original position, causing the substrate to reciprocate in the lateral direction (horizontal direction in the figure) and to return to the original position.

The displacement of the first substrate 11 causes fluctuations in the overlapped area between the electret material region 15 and the opposed conductive surface region 13, which results in a change in the amount of charge induced by the conductive surface regions 13. The vibration power generator 10 generates power by taking out the change in the amount of charge as the electric energy. A resonance frequency of vibration of the first substrate 11 is selected according to a frequency of the vibration to be used for power generation.

In the vibration power generator 10, however, the resonance frequency is determined depending on the states of the first substrate 11 and the spring 19, which disadvantageously makes it difficult to make the resonance frequency lower. In order to decrease the resonance frequency, it is necessary to increase the weight of the first substrate 11 or to decrease a spring constant of the spring 19. The spring 19 is normally formed of silicon or the like, which makes it difficult to decrease the spring constant of the spring 19 due to restrictions on the elastic constant of material or the size of the spring. For this reason, the weight of the first substrate 11 needs to be increased.

When the weight of the first substrate 11 is increased to make the resonance frequency lower, however, the spring 19 receives a large force produced by the vibration of the first substrate 11 (and the spring 19 is distorted largely). As a result, the spring 19 cannot be used for a long time. This leads to problems of insufficient durability and reliability of the vibration power generator 10.

In order to solve these problems, an electrostatic induction vibration power generator is proposed which can generate power from the vibration at a low frequency using a resin spring having higher resistance against elastic distortion (see Non-Patent Document 1).

FIG. 25 shows a schematic perspective view of an electrostatic induction vibration power generator using a resin spring as disclosed in Non-Patent Document 1. Referring to FIG. 25, the vibration power generator 20 includes a first substrate 21 with an electrode 23 including an electret film, a spring 29 for connecting each of both sides of the first substrate 21 to a fixed structure 27, and a second substrate 26 with an opposite electrode 25 formed thereover. The spring 29 is comprised of a parylene resin having the adequate durability, such as resistance to fatigue, and has a small elastic coefficient. Thus, the spring 29 enables the first substrate 21 to vibrate at a relatively low frequency with a high amplitude.

The spring 29 has a high aspect ratio structure in which its lengths in the directions perpendicular to an operating direction of the spring (that is, the directions y and z in the figure) is longer than that in the operation direction (that is, in the direction x in the figure). With this structure, the spring has a small spring constant in the operating direction and is likely to be deformed in the direction. In contrast, the spring has a large spring constant in the direction perpendicular to the operation direction, and thus is less likely to be deformed in the perpendicular direction. Thus, the spring is less likely to be bent in the directions other than the operation direction, so that the first substrate 21 is forced to vibrate only in the operating direction.

PRIOR ART DOCUMENTS

Patent Documents
Patent Document 1
Japanese Translation of PCT International Application Publication No. 2005-529574 (see pages 10 and 11, and FIG. 4)
Non-Patent Documents
Non-Patent Document 1
T. Tsutsumino, Y. Suzuki, N. Kasagi, and Y. Sakane, "Seismic Power Generator Using High-Performance Polymer Electret," IEEE Int. Conf. MEMS 2006, Istanbul, (2006), pp. 98-101 (see page 1, and FIG. 1)

DISCLOSURE OF THE INVENTION

Problems to be Solved by the Invention

As mentioned above, the structure using the mechanical spring made of silicon, as disclosed in Patent Document 1, has the problem of durability, including fatigue breakdown of the spring caused by the repeated use. In order to operate the vibration power generator using the resin spring in a further lower frequency range as disclosed in Non-Patent Document 1, a method is proposed which involves decreasing a spring constant of the resin spring 29 by increasing the length of the spring in the vibrational direction of the spring (in the direction x in FIG. 25). Such a method, however, also decreases a spring constant of the spring 29 in the direction other than the vibrational direction to displace the spring due to the external vibration in the direction other than a desired direction, and thus cannot stably operate the first substrate stably. As such, the vibration power generator using the resin spring is not appropriate for stably generating power from the vibration in the much lower frequency range.

In the vibration power generator 20 using the resin spring, the first substrate 21 for use is a silicon substrate or a glass substrate. The resin spring 29 is formed of resin, such as parylene, which is completely different from silicon and glass. That is why the structure and manufacturing process of the vibration power generator 20 becomes complicated.

The present invention has been made to solve the above problems, and thus it is an object of the present invention to provide a vibration power generator: i) which can ensure the high mechanical reliability without requiring a complicated structure and manufacturing process, ii) which has high operation stability, and iii) which can generate power from the vibration at a much lower frequency, and provide vibration power generation apparatus. Also, the present invention has another object to provide an electronic device and communication device with the vibration power generation apparatus mounted thereon.

Means for Solving the Problems

A preferred embodiment of the present invention provides a vibration power generator including:

a first substrate;

a first electrode disposed over at least one surface of the first substrate;

a second substrate opposed to the first substrate with distance from the first substrate; and a second electrode disposed over the second substrate to be opposed to the first electrode, wherein the first substrate is capable of vibrating with respect to the second substrate, any one of the first electrode and the second electrode includes a film holding electric charge, the power can be generated with use of a change in overlapped area viewed in a direction perpendicular to surfaces with the first electrode and the second electrode formed, which further includes:

a third electrode disposed at each of both ends of the surface of the first substrate with the first electrode formed, in a vibrational direction of the first substrate, and a fourth electrode disposed at each of both ends of the surface of the second substrate with the second electrode formed, in the vibrational direction of the first substrate, wherein the third electrode and the fourth electrode include a film holding the electric charge with the same polarity, and wherein, in a cross section taken along in the vibrational direction of the first substrate, an angle formed between a segment connecting a centroid of the third electrode positioned at one end and a centroid of the fourth electrode positioned at the one end, and a half line extending from the centroid of the fourth electrode positioned at the one end toward the fourth electrode positioned at the other end in parallel to the main surface of the second substrate does not exceed 55 degrees while the first substrate is stationary and vibrates, and wherein another angle formed between a segment connecting a centroid of the third electrode positioned at the other end and a centroid of the fourth electrode positioned at the other end, and a half line extending from the centroid of the fourth electrode positioned at the other end toward the fourth electrode positioned at the one end in parallel to the main surface of the second substrate does not exceed 55 degrees while the first substrate is stationary and vibrates.

Effects Of The Invention

The vibration power generator according to the embodiments of the present invention can use an electrostatic force as a restoring force of a spring to thereby solve the problem of durability, such as fatigue breakdown due to the repetition of use, which might be caused in the case of using a mechanical spring. Further, the vibration power generator according to the embodiments of the present invention can cause the first substrate to vibrate at a large amplitude even upon receiving the external vibration at a low frequency, for example, of about several Hz. Accordingly, the vibration power generator can generate power using the vibration in the low frequency range in the environment.

BRIEF DESCRIPTION OF THE DRAWINGS

FIG. 3(a) and FIG. 3(b) are top views showing a first substrate and a second substrate of a first modified example of the vibration power generator in the first embodiment, respectively.

FIG. 15 is a cross-sectional view of a vibration power generator according to a third embodiment.

Figure 1:
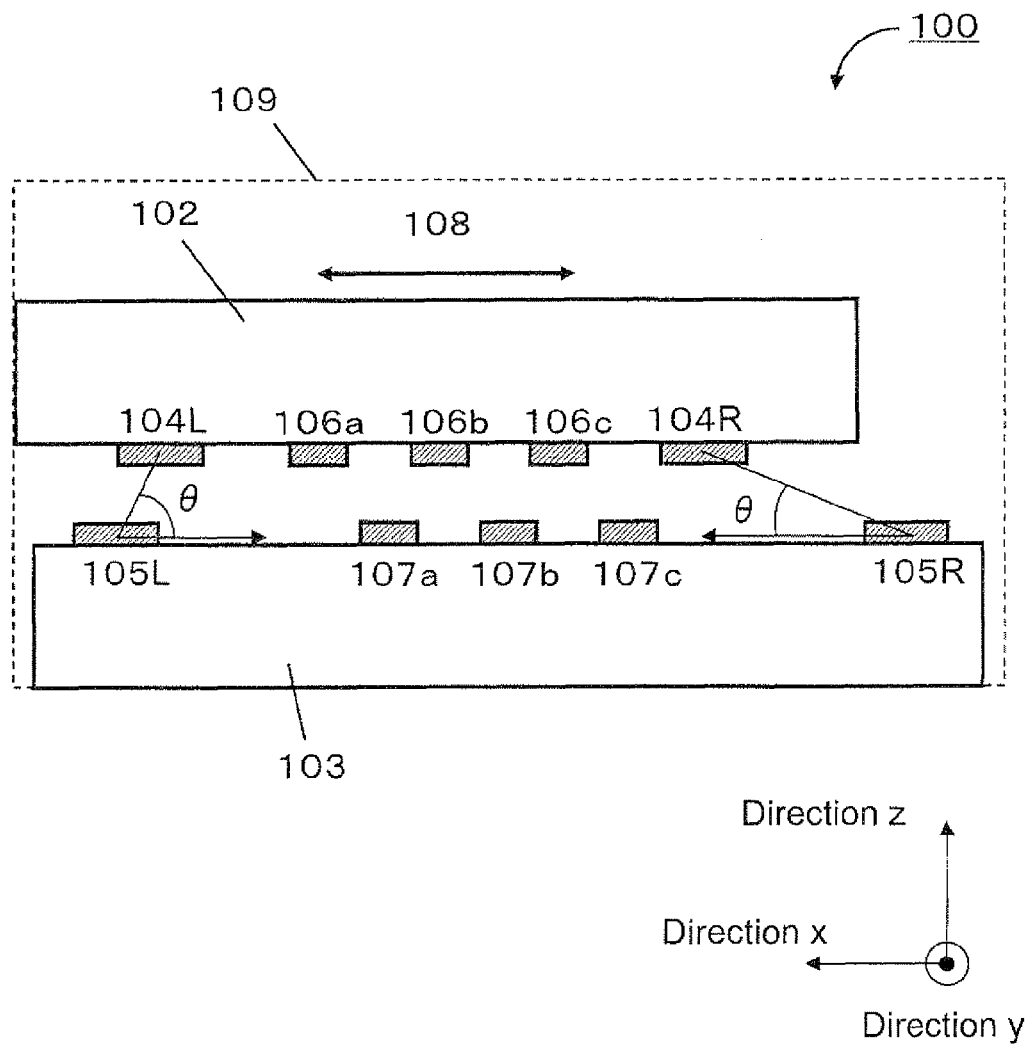
FIG. 1 is a cross-sectional view of a vibration power generator according to a first embodiment.

EMBODIMENT FOR CARRYING OUT THE INVENTION (First Aspect)

According to a first aspect of the present invention, there is provided a vibration power generator including:

a first substrate;

a first electrode disposed over at least one surface of the first substrate;

a second substrate opposed to the first substrate with distance from the first substrate; and a second electrode disposed over the second substrate to be opposed to the first electrode, wherein the first substrate is capable of vibrating with respect to the second substrate, any one of the first electrode and the second electrode includes a film holding electric charge, the power can be generated with use of a change in overlapped area viewed in a direction perpendicular to surfaces with the first electrode and the second electrode formed thereover, which further includes:

a third electrode disposed at each of both ends of the surface of the first substrate with the first electrode formed, in a vibrational direction of the first substrate, and a fourth electrode disposed at each of both ends of the surface of the second substrate with the second electrode formed, in the vibrational direction of the first substrate, wherein the third electrode and the fourth electrode include a film holding the electric charge with the same polarity, and wherein, in a cross section taken along in the vibrational direction of the first substrate, an angle formed between a segment connecting a centroid of the third electrode positioned at one end and a centroid of the fourth electrode positioned at the one end, and a half line extending from the centroid of the fourth electrode positioned at the one end toward the fourth electrode positioned at the other end in parallel to the main surface of the second substrate does not exceed 55 degrees while the first substrate is stationary and vibrates, and wherein another angle formed between a segment connecting a centroid of the third electrode positioned at the other end and a centroid of the fourth electrode positioned at the other end, and a half line extending from the centroid of the fourth electrode positioned at the other end toward the fourth electrode positioned at the one end in parallel to the main surface of the second substrate does not exceed 55 degrees while the first substrate is stationary and vibrates.

The vibration power generator in the first aspect includes electret electrodes (third and fourth electrodes) holding electric charges and serving as a spring with electrostatic force, which are formed over two substrates respectively, in addition to a conductive electrode and another electret electrode for power generation (first and second electrodes). With this arrangement, the electrostatic force acts on between the electret electrodes, so that the first substrate can be restored to the original position by the electrostatic force even when the first substrate is relatively displaced by the external vibration with respect to the second substrate. The vibration power generator according to the first aspect is constructed such that, in a cross section taken along in the vibrational direction of the first substrate, the angle formed between the segment connecting the centroid of the third electrode positioned at one end and the centroid of the fourth electrode positioned at the one end, and a half line extending from the centroid of the fourth electrode positioned at the one end toward the third electrode in the stationary state (that is, the fourth electrode positioned at the other end) in parallel to the main surface of the second substrate does not exceed 55 degrees while the first substrate is stationary and vibrates. With this arrangement, the electrostatic force generated between the third and fourth electrodes is used as the restoring force of the spring, so that the first substrate can stably vibrate.

(Second Aspect)

According to a second aspect of the present invention, the vibration power generator according to the first aspect further includes:

a first stopper formed at each of both sides of the first substrate in the vibrational direction;

a second stopper which is contactable with the first stopper; and a fixed structure, wherein the fixed structure is formed at the second substrate, and the second stopper is formed at the fixed structure, wherein when g is a distance between the first substrate and the second substrate and k is a distance between the centroids of the third electrode and the fourth electrode, a length kv that is a length of the distance k in the vibrational direction of the first substrate wherein k is a displacement distance of the first substrate until the first stopper is in contact with the second stopper, is equal to or more than g/tan 55°.

This arrangement can prevent the first substrate from being displaced at an angle exceeding 55 degrees, and thus can prevent the decrease in power generation efficiency of the vibration power generator.

(Third Aspect)

According to a third aspect of the present invention, the vibration power generator according to the first aspect further includes:

a stopper that is contactable with each of both sides of the first substrate in the vibrational direction; and a fixed structure, wherein the fixed structure is formed at the second substrate, and the stopper is formed at the fixed structure, wherein when g is a distance between the first substrate and the second substrate and k is a distance between the centroids of the third electrode and the fourth electrode, a length kv that is a length of the distance k in the vibrational direction of the first substrate wherein k is a displacement distance of the first substrate until either of both sides is in contact with the stopper, is equal to or more than g/tan 55°.

(Fourth Aspect)

According to a fourth aspect of the present invention, the vibration power generator according to any one of the first to third aspects further includes a fifth electrode disposed at each of both ends of the surface of the second substrate with the fourth electrode formed, in the vibrational direction of the first substrate, wherein the fifth electrode is formed on the center side of the second substrate with respect to the fourth electrode, and wherein the fifth electrode includes a film holding the electric charge with the same polarity as that of each of the third and fourth electrodes.

The vibration power generator according to the fourth aspect further includes the electret electrode (fifth electrode) holding the electric charge over the second substrate. This arrangement can lift the first substrate by means of the electrostatic force at both ends in the vibrational direction of the first substrate even when the first substrate is displaced, so that the vibration power generator can be stably operated.

(Fifth Aspect)

In a fifth aspect of the present invention, there is provided the vibration power generator according to the fourth aspect, wherein an angle formed between a segment connecting the centroid of the third electrode positioned at one end and the centroid of the fifth electrode positioned at the one end, and a half line extending from the centroid of the fifth electrode positioned at the one end toward the fourth electrode positioned at the one end in parallel to the main surface of the second substrate does not exceed 55 degrees while the first substrate is stationary and vibrates, and wherein another angle formed between a segment connecting the centroid of the fourth electrode positioned at the other end and the centroid of the fifth electrode positioned at the other end, and a half line extending from the centroid of the fifth electrode positioned at the other end toward the fourth electrode positioned at the other end in parallel to the main surface of the second substrate does not exceed 55 degrees while the first substrate is stationary and vibrates.

(Sixth Aspect)

According to a sixth aspect of the present invention, there is provided a vibration power generation apparatus including:

the vibration power generator according to any one of the first to fifth aspects; and a rectifying circuit for rectifying and converting an AC output voltage from the vibration power generator into a DC voltage.

(Seventh Aspect)

According to a seventh aspect of the present invention, the vibration power generation apparatus according to the six aspect further includes:

a voltage conversion circuit for converting the DC voltage output from the rectifying circuit into a desired voltage level;

a storing circuit for storing power generated by the vibration power generator when an output from the vibration power generation apparatus is not required;

a voltage control circuit for controlling a voltage output from the voltage conversion circuit or the storing circuit to a predetermined voltage; and an output switching circuit for switching the output from the voltage conversion circuit between the storing circuit and the voltage control circuit.

(Eighth Aspect)

According to an eighth aspect of the invention, there is provided a communication device which uses the vibration power generation apparatus according to the sixth or seventh aspect.

(Ninth Aspect)

According to a ninth aspect of the invention, there is provided a communication device which includes the vibration power generator according to any one of the first to fifth aspects, and a battery.

(Tenth Aspect)

According to a tenth aspect of the invention, there is provided an electronic device which uses the power generation apparatus according to the sixth or seventh aspect.

(Eleventh Aspect)

According to an eleventh aspect of the invention, there is provided an electronic device which includes the vibration power generator according to any one of the first to fifth aspects, and a battery.

Preferred embodiments of the present invention will be described below with reference to the accompanying drawings. In the following description, terms indicative of specific directions and positions (for example, the terms "upper", "lower", "left", "right", and other terms including these words) are used if necessary. These words are used only for easy understanding of the invention referring to the drawings, and are construed to have no meanings to limit the technical scope of the invention.

(First Embodiment)

Figure 2A:
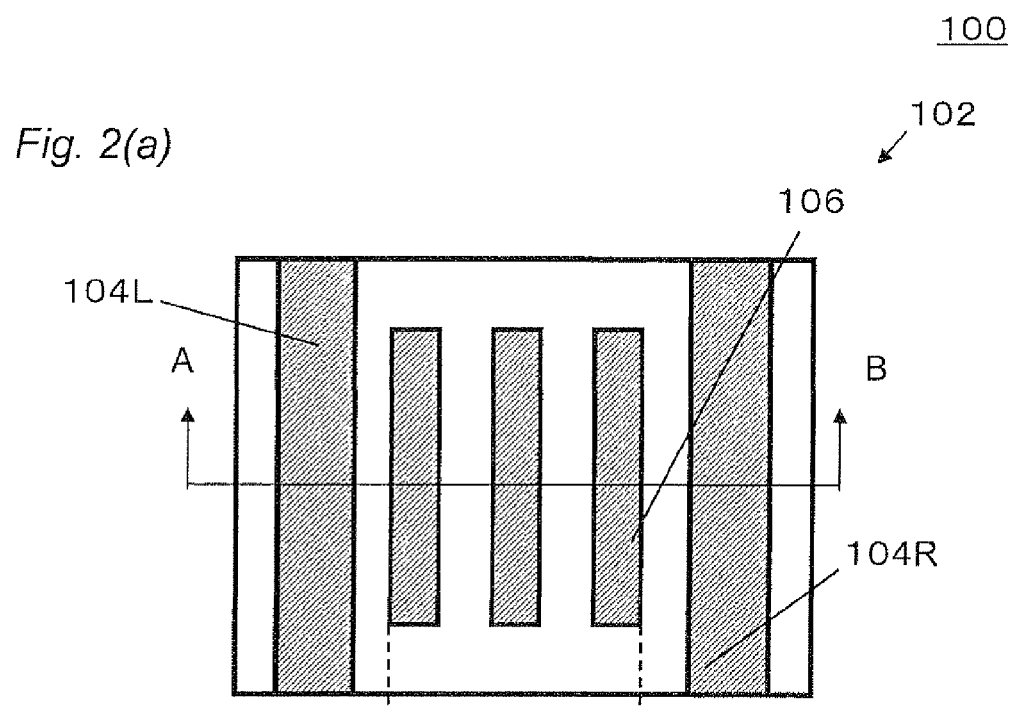
FIG. 2(a) and FIG. 2(b) are top views showing a first substrate and a second substrate of the vibration power generator in the first embodiment, respectively.
Figure 2B:
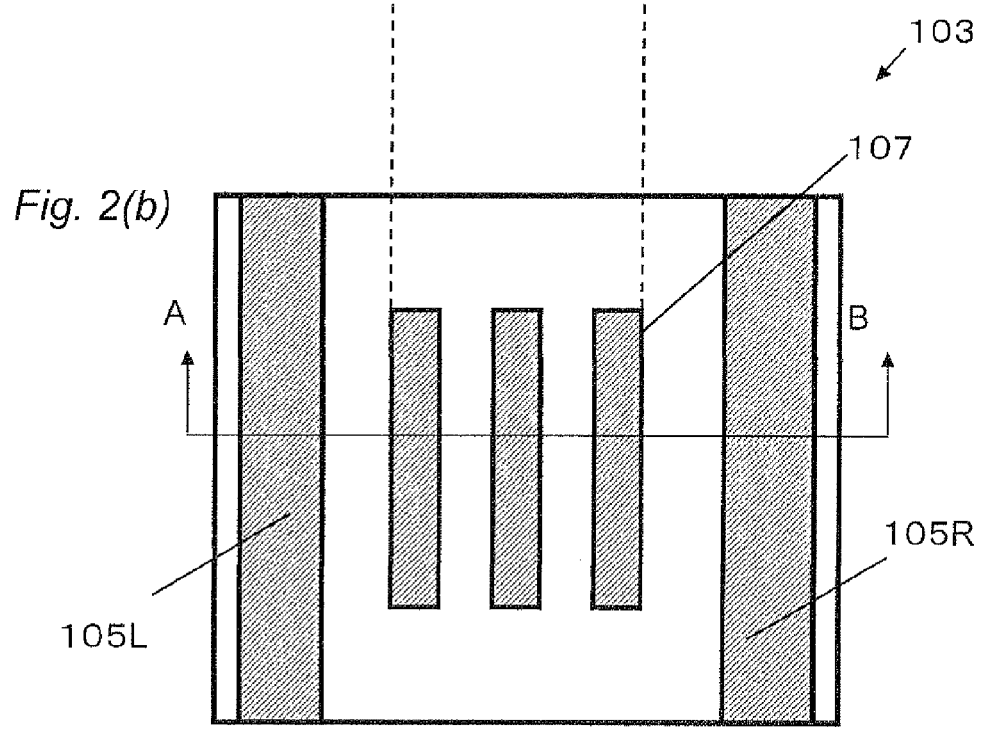

FIG. 1 is a cross-sectional view of a vibration power generator 100 in a first embodiment. FIG. 2(a) and FIG. 2(b) are plan views of a first substrate and a second substrate of the vibration power generator 100 shown in FIG. 1. The cross-section shown in FIG. 1 corresponds to the cross-section taken along the line A-B of FIG. 2.

The vibration power generator 100 comprises a first substrate 102 and a second substrate 103. The first substrate 102 and the second substrate 103 each are comprised of a Si substrate. The first substrate 102 and the second substrate 103 have respective substrate surfaces (each corresponding to a main surface at which an electrode is formed) which are opposed to each other with a certain distance. The first substrate 102 is kept floating in air. The second substrate 103 is fixed (not shown). Third electrodes 104L and 104R are formed over the first substrate 102. Fourth electrodes 104L and 104R are formed over the second substrate 103. The third electrodes 104L and 104R and the fourth electrodes 105L and 105R are respectively positioned over the opposed substrate surfaces. As will be described later, the first substrate 102 is kept floating in air by electrostatic force (repulsion force) generated between the third electrodes 104L and 104R and the fourth electrodes 105L and 105R when the first substrate is stationary. And, the first substrate 102 vibrates in the direction indicated by an arrow 108 in the presence of external vibration. This figure is regarded as a cross-section taken along in the vibrational direction of the first substrate 102. FIG. 1 shows the state of the first substrate 102 displaced leftward.

In the illustrated embodiment, the third electrodes 104L and 104R are respectively provided in the vicinity of both ends of the first substrate 102 in the vibrational direction. The two fourth electrodes 105L and 105R each are positioned at the same side as the third electrodes 104L and 104R, respectively, with respect to the center in the vibrational direction of the first substrate. That is, referring to FIG. 1, the third electrode 104L and the fourth electrode 105L are positioned on the left side of the center in the vibrational direction. The third electrode 104R and the fourth electrode 105R are positioned on the right side of the center in the vibrational direction.

As shown in FIG. 1, a pair of the third electrode and the fourth electrode (a pair of the electrodes 104L and 105L, and a pair of the electrodes 104R and 105R) are symmetric about the center in the vibrational direction on the cross section taken along the vibrational direction. In this embodiment, the number of the third electrodes and the fourth electrodes (the number of electrodes calculated on the cross section taken along the vibrational direction) is not specifically limited. However, provision of the third and fourth electrodes on both ends in the vibrational direction easily keeps the distance between the first substrate and the second substrate.

The third electrode and the fourth electrode each are an electret electrode including a film which holds an electric charge of the same polarity. The charges of the same polarity generate the electrostatic force (repulsion force) whereby the charges are repelled from each other. The electrostatic force changes according to a relative positional relationship between the first substrate and the second substrate 103. The electrostatic force can be decomposed into forces of a direction parallel to the main surface of the second substrate 103 and parallel to the vibrational direction 108 of the first substrate 102 (that is, in the direction x shown in FIG. 1), a direction perpendicular to the main surface of the second substrate 103 (in the direction z in FIG. 1), and a direction parallel to the main surface of the second substrate and perpendicular to the vibrational direction 108 of the first substrate 102 (in the direction y in FIG. 1, that is, in the direction perpendicular to the paper surface). The component of the electrostatic force in the direction z ensures the state in which the first substrate 102 is opposed to the second substrate 103 with a certain distance, that is, the first substrate 102 is floated in air.

The component of the electrostatic force in the direction x serves as a force (restoring force) to restore the first substrate 102 to the original position when the external force acts on the first substrate 102 to move the first substrate in any one of the vibrational directions. Specifically, when the first substrate 102 displaces leftward and the third electrode 104L approaches the fourth electrode 105L, repulsive force caused by the electrostatic force acts on between two electrodes to move the third electrode 104L in the direction away from the fourth electrode, that is, to displace the first substrate 102 rightward. Then, the same electrostatic force is applied to between the third electrode 104R and the fourth electrode 105R to displace the first substrate 102 leftward. The repetition of the displacement vibrates the first substrate 102 in the direction indicated by the arrow 108.

The vibration power generator of this embodiment is configured such that, an angle θ formed between a segment connecting the centroid of the third electrode 104L (104R) and the centroid of the fourth electrode 105L (105R), and a half line extending from the centroid of the fourth electrode 105L (105R) in parallel to the main surface of the second substrate 103 toward the third electrode 104L (104R) in a stationary state does not exceed 55 degrees while the first substrate 102 is stationary and vibrates.

More specifically, the angle θ is an angle formed between a segment connecting the centroid of the third electrode 104L and the centroid of the fourth electrode 105L on the left side in the figure, and a half line extending from the centroid of the fourth electrode 105L toward the fourth electrode 105R in parallel to the main surface of the second substrate 103. Further, the angle θ is an angle formed between a segment connecting the centroid of the third electrode 104R and the centroid of the fourth electrode 105R on the right side in the figure, and a half line extending from the centroid of the fourth electrode 105R toward the fourth electrode 105L in parallel to the main surface of the second substrate 103.

The term "third electrode in the stationary state" as used herein means the third electrode standing still without vibration of the first substrate.

Referred to FIG. 1, the third electrode 104L in the stationary state is positioned on the right side with respect to the centroid of the fourth electrode 105L, while the third electrode 104R in the stationary state is positioned on the left side with respect to the centroid of the fourth electrode 105R. The half line that determines the angle θ means a half line extending rightward from the fourth electrode 105L in parallel to the main surface of the second substrate 103, and a half line extending leftward from the fourth electrode 105R in parallel to the main surface of the second substrate 103. The vibration power generator 100 shown in FIG. 1 is configured such that the two angles θ do not exceed 55 degrees while the first substrate 102 is stationary and vibrates.

Specifically, as shown in FIG. 1, the vibration power generator is configured such that the angle θ does not exceed 55 degrees even when the first substrate 102 displaces most leftward. Such an arrangement can be obtained by restricting the size of a casing 109 for accommodating therein the vibration power generator such that an inner wall of the casing serves as a stopper as indicated by a dotted line in the figure. The formation of the casing 109 prevents the first substrate 102 from significantly displacing leftward and rightward, so that the angle θ does not exceed 55 degrees.

First electrodes 106a, 106b, and 106c are formed at the surface of the first substrate 102 with the electrodes 104L and 104R formed thereover. Second electrodes 107a, 107b, and 107c are formed at the surface of the second substrate 103 with the electrodes 105L and 105R formed thereover. Either the first electrode 106a (106b or 106c) or the second electrode 107a (107b or 107c) is an electret electrode containing a film holding electric charge. In this embodiment, the first electrodes 106a, 106b, and 106c hold the electric charge. The overlapped area in the direction z between the first electrodes 106a, 106b, and 106c and the second electrodes 107a, 107b, and 107c changes depending on the vibration of the first substrate 102. The power generation is carried out by use of a change in the overlapped area. As mentioned above, FIG. 1 is a cross-sectional view of the vibration power generator when the first substrate 102 is displaced by the vibration. When the first substrate 102 is stationary or stands still, the centroids of the first electrodes 106a, 106b, and 106c are superimposed on the centroids of the second electrodes 107a, 107b, and 107c in the direction z.

As mentioned above, the electrodes 104L, 104R, 105L, and 105R, and 106a, 106b, and 106c are electrodes including an inorganic electret film made of a silicon oxide film or the like holding the electric charge. The electrodes 104L and 105L hold the charge of the same polarity. Also, the electrodes 104R and 105R hold the charge of the same polarity. The electret film has a laminated structure of a silicon oxide film and a silicon nitride film over a doped polycrystalline Si film. With such a structure, all materials for the vibration power generator 100 are comprised of Si-based materials, and thus the film-formation process can be performed using a CMOS process. This can manufacture the vibration power generator 100 using existing equipment or the like, which is advantageous from the viewpoint of cost. The CMOS process is appropriate for formation of fine patterns, and hence can form fine electrodes with high accuracy. The third electrodes 104L and 104R preferably have the same polarity as that of the first electrodes 106a, 106b, and 106c. This arrangement can supply electric charge to these electrodes at the same time, which can simplify the manufacturing process.

Next, the arrangement of the electrodes will be described below. The first electrode 106 includes a plurality of strip-like electrodes 106a, 106b, and 106c extending in the direction y. The electrodes are electrically connected to each other. The second electrode 107 also includes a plurality of strip-like electrodes 107a, 107b, and 107c extending in the direction y. The electrodes are electrically connected to each other. The structure of wiring is so simple that the illustration thereof will be omitted in the figure.

As shown in FIG. 2, the third electrodes 104L and 104R are disposed near both ends of the first substrate 102 in the vibrational direction. The fourth electrodes 105L and 105R are disposed near both ends of the second substrate 103 in the first vibrational direction. In the illustrated embodiment, the third electrodes and the fourth electrodes are arranged in the following manner. When the first substrate 102 is stationary, the outer edges of the fourth electrodes 105L and 105R are positioned outside the outer edges of the third electrodes 104L and 104R, and the third electrodes 104L and 104R are partly superimposed on the fourth electrodes 105L and 105R in the direction z. This is because, when the first substrate 102 vibrates, the angle θ does not exceed 55 degrees, and when the first substrate 102 is stationary, the first substrate 102 floats in air. If the third electrodes are not superimposed on the fourth electrodes in the direction z at all, the component of the electrostatic force in the direction z becomes so small that the first substrate may not float in air.

The operation of the thus structured vibration power generator will be described below.

When vibration is applied to the vibration power generator 100 from the outside, the first substrate 102 is relatively displaced with respect to the second substrate 103. At this time the electrodes 104L and 105L have the charge with the same polarity, and the electrodes 104R and 105R have the same polarity. For this reason, when the electrodes get close to each other, the electrostatic force becomes higher, so that the first substrate 102 is pushed in the direction opposite to the displacement direction to return to the original position.

In this way, the first substrate 102 is relatively displaced with respect to the second substrate 103, which leads to fluctuations in the overlapped area between the electrodes 106a, 106b, and 106c and the electrodes 107a, 107b, and 107c. The fluctuations in the overlapped area change the amount of charge induced in the electrodes 107a, 107h, an 107c. The power generation is carried out by taking out the charge as the electric energy.

The vibration power generator 100 according to this embodiment can have the following effects.
1. Improvement of reliability
2. Decreasing frequency of vibration that can generate power
3. Improvement of output of generated power, and stable operation First, the effect 1 will be described in detail below. In this embodiment, since the first substrate is operated using the electrostatic force, the vibration power generator 100 does not have a mechanical connection mechanism, and thus does not experience the fatigue breakdown of the spring due to the repetition of use. This embodiment can improve the durability of the vibration power generator 100, and thus can improve the reliability of the vibration power generator. Since there is no need to form components using different materials, such as the substrate made of silicon and glass, and the resin spring, this embodiment has an advantage that the structure and manufacturing process are not complicated.

Next, the effect 2 will be described in detail below. The vibration power generator 100 of this embodiment vibrates the first substrate 102 using the electric repulsion force caused by the electrostatic force. Thus, the spring force pushing back the first substrate 102 depends on the amount of change held by the third electrode 104L (104R) and the fourth electrode 105L (105R), and not on the elastic coefficient of material or the shape of the spring. The electrostatic force applied to the first substrate 102 is inversely proportional to the square of the distance between the third electrode 104L (104R) and the fourth electrode 105L (105R). For this reason, when the distance between the electrodes is large, the electrostatic force becomes very small, as compared to the force of the mechanical spring of F=kx for pushing back the first substrate 102. Thus, the first substrate 102 can be displaced easily and largely with the small external force without depending on the frequency. The vibration power generator of this embodiment can also generate power even when the vibration in the low frequency range (or the vibration in the environment) is applied. The vibration power generator of this embodiment can generate power even with the external force applied thereto by the vibration at a low frequency of, for example, several Hz (for example, 1 to 2 Hz).

Figure 8:
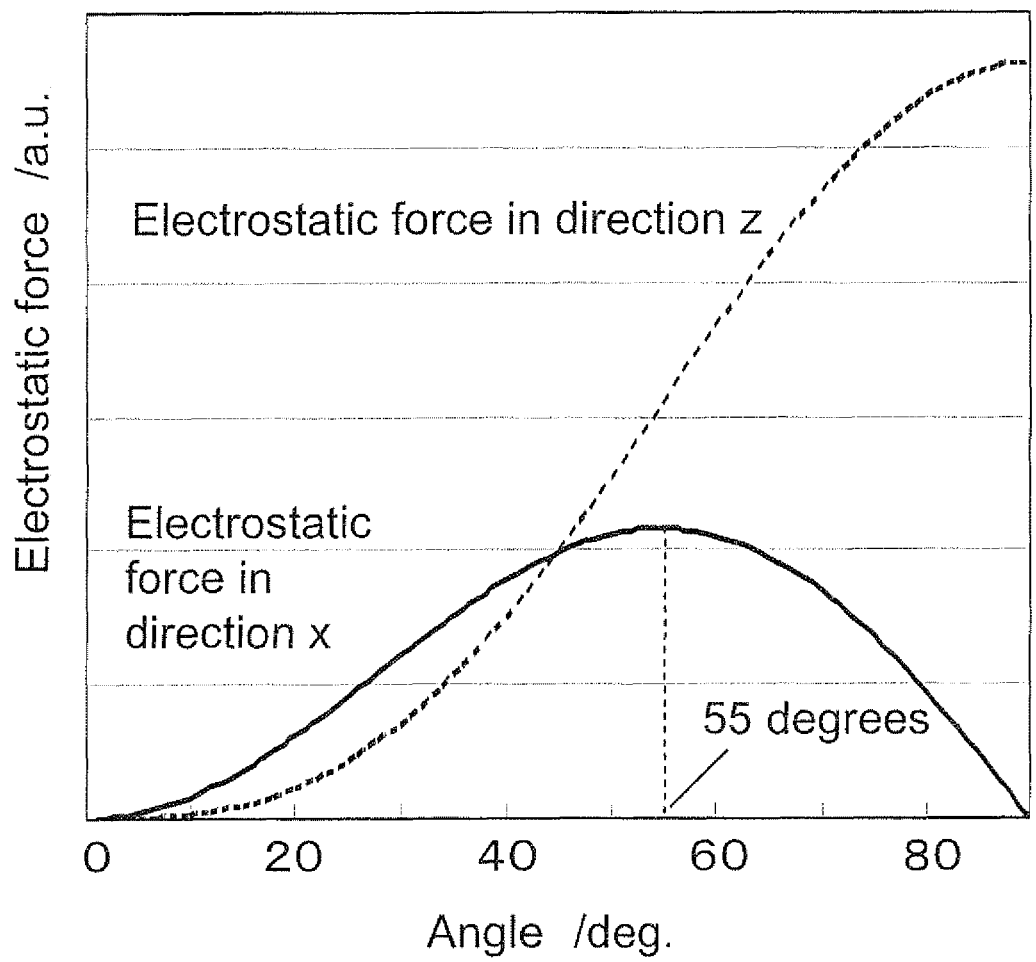
FIG. 8 is a graph showing the relationship between the position of an electrode and the electrostatic force generated between the electrodes of the vibration power generator in the first embodiment.

Finally, the effect 3 will be described in detail below. FIG. 8 shows the relationship between the electrostatic force acting on the first substrate 102 and the angle θ. Note that in order to observe the behavior at an angle of 55 degrees or more, the casing 109 indicated by a dotted line is neglected in FIG. 1. The electrostatic force in the direction x that pushes back the first substrate 102 simply increases in a range of the angle θ of 0 to 55 degrees, while simply decreases as the angle θ exceeds 55 degrees to approach 90 degrees. As can be seen from FIG. 8, in the angle θ in a range of 0 to 90 degrees, the electrostatic force in the direction x works to push back the first substrate 102. Thus, in order to exhibit the spring effect by means of the electrostatic force, the vibration power generator of this embodiment needs to be operated in the range of the angle θ of 0 to 90 degrees.

Further, as can be seen from FIG. 8, the increasing electrostatic force in the direction x starts to decrease at an angle θ of 55 degrees. The electrostatic force in the direction z is increased with increasing angle θ. The excessively large electrostatic force in the direction z generates a large repulsion force between the third and fourth electrodes. As a result, the distance between the substrates becomes larger at one end of the substrate, but smaller at the other end, which makes a difference in the electrostatic force between both ends of the first substrate to destabilize the operation of the vibration power generator.

Figure 9:
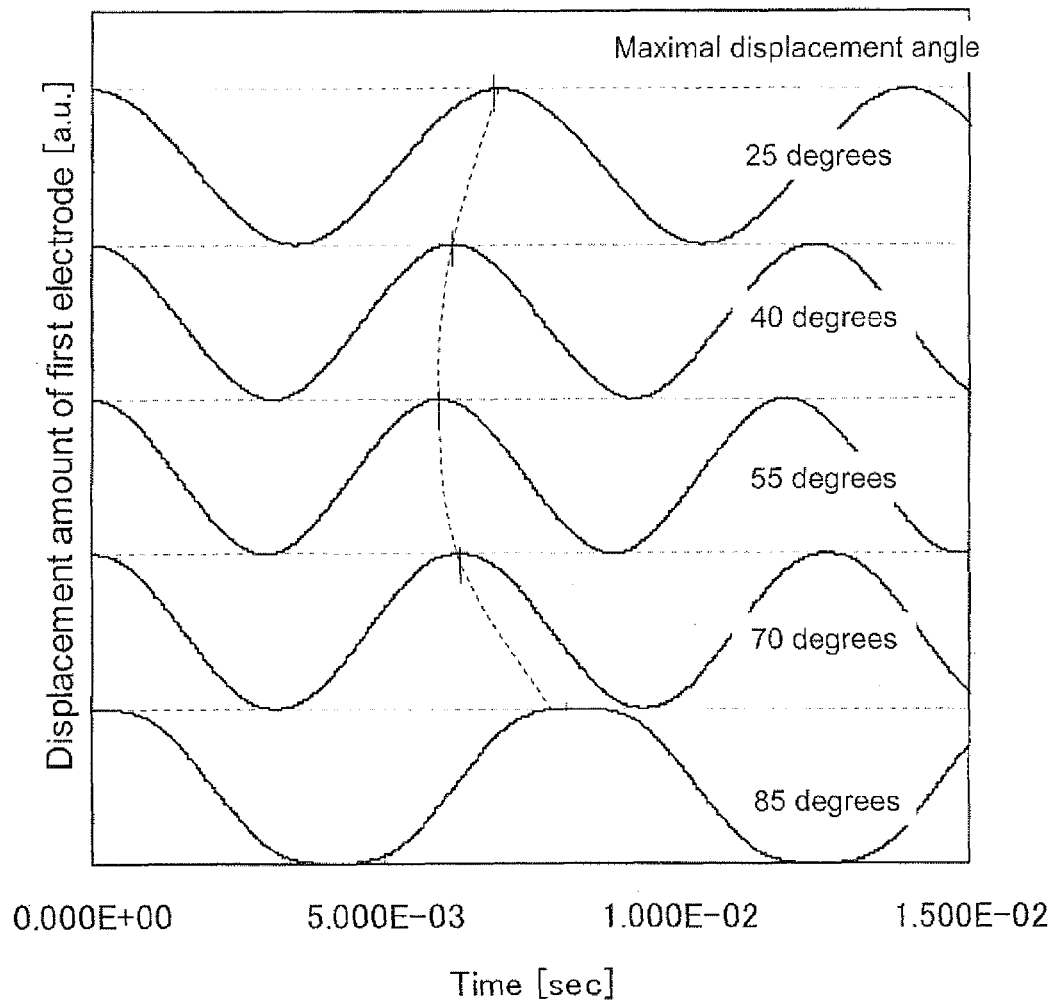
FIG. 9 is a graph showing the relationship between an initial angle and an amplitude of the first substrate in the vibration power generator according to the first embodiment.

FIG. 9 shows the result of calculation of a change in the amplitude of the first substrate 102 when the substrate is first moved to an initial angle shown and then starts to vibrate by the electrostatic force at an initial velocity of 0 on the following conditions: the amount of electric charge held by each of the third electrodes 104L and 104R and the fourth electrodes 105L and 105R is $1.0 \times 10^{-10}$ [C], the weight of the first substrate 102 is 0.17 [g], the distance g between the first substrate 102 and the second substrate 103 is 40 [μm], and an angle θ of 17 degrees when the first substrate 102 is stationary while no external force is applied. In the calculation, the casing 109 represented by the broken line in FIG. 1 is neglected, and the distance g between the first substrate 102 and the second substrate 103 is set to a constant value.

Referring to FIG. 9, when the first substrate 102 is displaced in the angle range of 55 degrees or less, the frequency of the vibration increases with increasing maximum amplitude. When the first substrate 102 is displaced in the angle range exceeding 55 degrees, the component of the electrostatic force in the direction x becomes smaller as the angle approaches 90 degrees, which results in a decrease in frequency of the vibration. When the first substrate 102 vibrates with a maximum amplitude at the angle of 55 degrees, and the frequency of the vibration is set to 1 at the angle of 55 degrees, the frequency of the vibration at 25 degrees is 0.85. Thus, the vibration power generator can be applied to a wide range of frequency of the external force.

As mentioned above, as the angle θ increases, the electrostatic force in the direction z applied to the first substrate 102 is increased. In the range of the angle θ close to 90 degrees, when the first substrate 102 vibrates, a difference in the electrostatic force in the direction z between the left and right sides of the substrate becomes large, so that the substrate cannot stably vibrate.

In operating the vibration power generator in a range of the angle θ of 55 degrees or less (from 0 to 55 degrees) with a gap of 40 μm, the first substrate 102 offers a small increase in angle with respect to the amplitude in a low angle region, so that the first substrate can be displaced by 2000 μm or more. As a result, the vibration power generator can sufficiently ensure the amplitude of the substrate to increase the generated power output.

As mentioned above, the power generator can be applied to the wide change in the frequency of the external vibration by being operated in the angle range of 55 degrees or less, which enables the stable operation of the first substrate 102.

In the vibration power generator 100 of the first embodiment, the use of the inner wall of the casing 109 prevents the first substrate 102 from displacing leftward or rightward at the angle θ exceeding 55 degrees. When the vibration of the low frequency is applied from the outside to the vibration power generator 100 to start the vibration of the first substrate 102, the output of generated power can be increased to thereby vibrate the substrate stably.

In all embodiments including the following embodiment, the vibration power generator is designed and manufactured such that the angle θ does not exceed 55 degrees. The vibration power generator actually manufactured, however, may have an error in the manufacturing process. Due to the error, the first substrate sometimes vibrates in such a manner that the angle θ slightly exceeds 55 degrees. It is noted that the vibration power generator according to the embodiments of the present invention can include one wherein the first substrate is displaced up to the position at the angle θ exceeding 55 degrees due to the manufacturing error.

In this embodiment, the first substrate 102 and the second substrate 103 each are comprised of a Si substrate. Such a substrate is not limited to the Si substrate, and may be a substrate made of any material, such as resin, glass, or ceramic.

The conductive electrode may be formed of a material other than the doped polycrystalline Si, for example, metal, such as Al. When the metal is used, the resistivity of the electrode can be decreased to thereby reduce the loss in power of the vibration power generator, and thus, the effects, such as effective output of the electric charges induced by the electrostatic induction can be obtained.

The electret film may be comprised of an inorganic material, such as a silicon oxide film or silicon nitride film. Alternatively, the electret film may be formed of an organic material, such as PTFE, to achieve the same effects. The electret film formed using the silicon oxide film or silicon nitride film as the inorganic electret film can hold the electric charge at a high temperature to stabilize the charge, as compared to the electret film formed using the organic electret material.

In this embodiment, the first substrate floats in air. In a modified example of this embodiment, a protrusion may be formed at any one of the first substrate and the second substrate, and may be positioned in contact with the other substrate, which maintains the distance between the first substrate and the second substrate. Also, the modified example can obtain the same effects as those of the vibration power generator shown in FIG. 1.

The silicon oxide film as the electret film may be formed by the CVD, or sputtering. Likewise, the silicon nitride film may be formed by the CVD. When the electret film is deposited directly over the Si substrate using the Si substrate as the electrode, the film formation can also be performed using thermal oxidation, which can form a fine film with high accuracy.

In this embodiment, each of the electrodes 106a, 106b, and 106c is an electrode including the electret film holding the electric charge, and each of the electrodes 107a, 107b, and 107c is a conductive electrode. In the modified example of this embodiment, each of the electrodes 106a, 106b, and 106c may be a conductive electrode, and each of the electrodes 107a, 107b, and 107c may be an electrode including the electret film holding the charge. Also, the modified example can also obtain the same effects as those of the vibration power generator shown in FIG. 1.

As shown in FIG. 2, in this embodiment, the third electrode and the fourth electrode are formed in a strip-like shape near the ends of the substrate. In a vibration power generator 120 in the modified example of this embodiment, third electrodes 124 and 125 may be formed so as to occupy respective regions shown in FIGS. 3(a) and 3(b). In FIG. 3, a first electrode and a second electrode are denoted by 126 and 127, respectively. The arrangement of these electrodes is the same as that of the first electrode 106 and the second electrode 107 shown in FIGS. 1 and 2. The vibration power generator 120 with the structure shown in FIG. 3 has the same effects as those of the vibration power generator 100 shown in FIGS. 1 and 2. The formation of the third and fourth electrodes as shown in FIG. 3 advantageously generates the force restoring the substrate to its center even when the substrate is displaced in the direction other than the vibrational direction, and can operate the vibrational power generator 120 more stably.

Any one of the embodiments shown is an example of this embodiment. The number, shape, size, and thickness of the electrodes, and the amount of charge held by electrode are not specifically limited. The effects of this embodiment can be also obtained even if arbitrary selection is made with respect to these factors.

Figure 4:
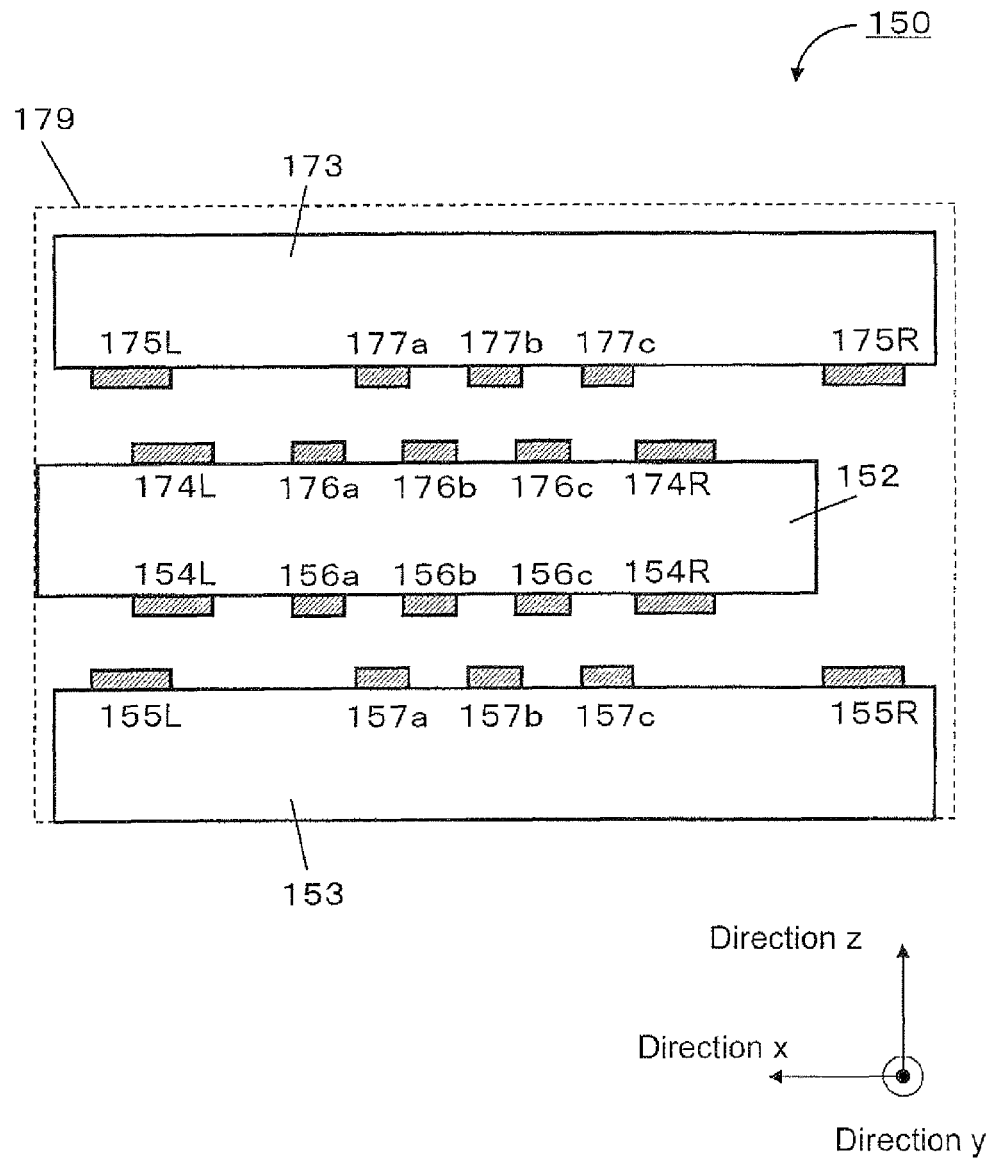
FIG. 4 is a cross-sectional view of a second modified example of the vibration power generator in the first embodiment.

FIG. 4 shows a modified example of this embodiment. FIG. 4 is a cross-sectional view taken along the vibrational direction of the first substrate 152 of the vibration power generator 150. The vibration power generation 150 includes a first substrate 152 and two second substrates 153 and 173. The lower-side second substrate 153 is opposed to the first substrate 152 with distance from one main surface of the first substrate 152. The upper-side second substrate 173 is opposed to the first substrate 152 with distance from the other main surface of the first substrate 152. Over one surface (lower-side surface) of the first substrate 152, lower-side third electrodes 154L and 154R are formed, and lower-side first electrodes 156a, 156b, and 156c for power generation are further formed. Over the lower-side second substrate 153, lower-side fourth electrodes 155L and 155R are formed, and lower-side second electrodes 157a, 157b, and 157c for power generation are further formed. In the illustrated embodiment, the lower-side first electrodes 156a, 156b, and 156c are electrically charged. Over the other surface (upper-side surface)

of the first substrate 152, upper-side third electrodes 174L and 174R are formed, and upper-side first electrodes 176a, 176b, and 176c for power generation are formed. Over the upper-side second substrate 173, upper-side fourth electrodes 175L and 175R are formed, and upper-side second electrodes 177a, 177b, and 177c for power generation are formed. In the illustrated embodiment, the upper-side first electrodes 176a, 176b, and 176c are electrically charged.

The lower-side third electrodes 154L and 154R, and the lower-side fourth electrodes 155L and 155R are charged to have the same polarity, such that the electrostatic force acts on between the third and fourth electrodes. Likewise, the upper-side third electrodes 174L and 175R, and the upper-side fourth electrodes 175L and 175R are charged to have the same polarity, such that the electrostatic force acts on between the third and fourth electrodes. The polarity of the charge of the upper-side third electrodes 174L and 174R may be the same as or different from the polarity of the charge of the lower-side third electrodes 154L and 154R.

When the external vibration is applied to the vibration power generator 150, the first substrate 152 vibrates in the direction x to be displaced with respect to the lower-side and upper-side second substrates 153 and 173. Thus, the overlapped area between the lower-side first electrodes 156a, 156b, and 156c and the lower-side second electrode 157a, 157b, and 157c, and the overlapped area between the upper-side first electrodes 176a, 176b, and 176c and the upper-side second electrodes 177a, 177b, and 177c are changed to cause fluctuations in amount of the charge induced in the first electrodes. The charge can be taken as the electric energy to generate power.

Also, in the vibration power generator 150 shown in FIG. 4, the displacement of the first substrate 152 is restricted by a casing 179 in the following way. The angle θ (not shown) formed between a segment connecting the centroid of the third electrode 154L, (154R, 174L, 174R) positioned at one end and the centroid of the fourth electrode 155L (155R, 175L, 175R) positioned at the one end (not shown), and a half line extending from the centroid of the fourth electrode 155L (155R, 175L, 175R) positioned at the one end in parallel to the main surface of the second substrate 153 (173) toward the third electrode 154L (154R, 174L, 174R) in a stationary state (that is, toward the fourth electrode positioned at the other end) does not exceed 55 degrees while the first substrate 152 is stationary and vibrates. The effects made by this arrangement are the same as those of the vibration power generator 100 previously described with reference to FIG. 1. The arrangement and material of the electrodes, and the material of the substrate are as described with reference to FIGS. 1 to 3, and thus a description thereof will be omitted below.

In the vibration power generator 150 shown in FIG. 4, two pairs of opposed first electrode and second electrode (pair of electrodes 156a, 156b, 156c, and electrodes 157a, 157b, 157c, and another pair of electrodes 176a, 176b, 176c, and 177a, 177b, 177c) can be used to take out the electric energy of reversed-phase voltages. That is, the power output from the vibration power generator 150 in a single vibration of the first substrate 152 is twice as much as the power output from the vibration power generator 100 shown in FIG. 1 with the electrodes formed over only one main surface of the first substrate. Thus, the structure shown in FIG. 4 can provide the vibration power generator that can be mounted in a smaller area. Alternatively, as compared to the structure shown in FIG. 1, upon mounted in the same mounting area, the structure shown in FIG. 4 can provide the vibration power generator that outputs a higher power.

Figure 5:
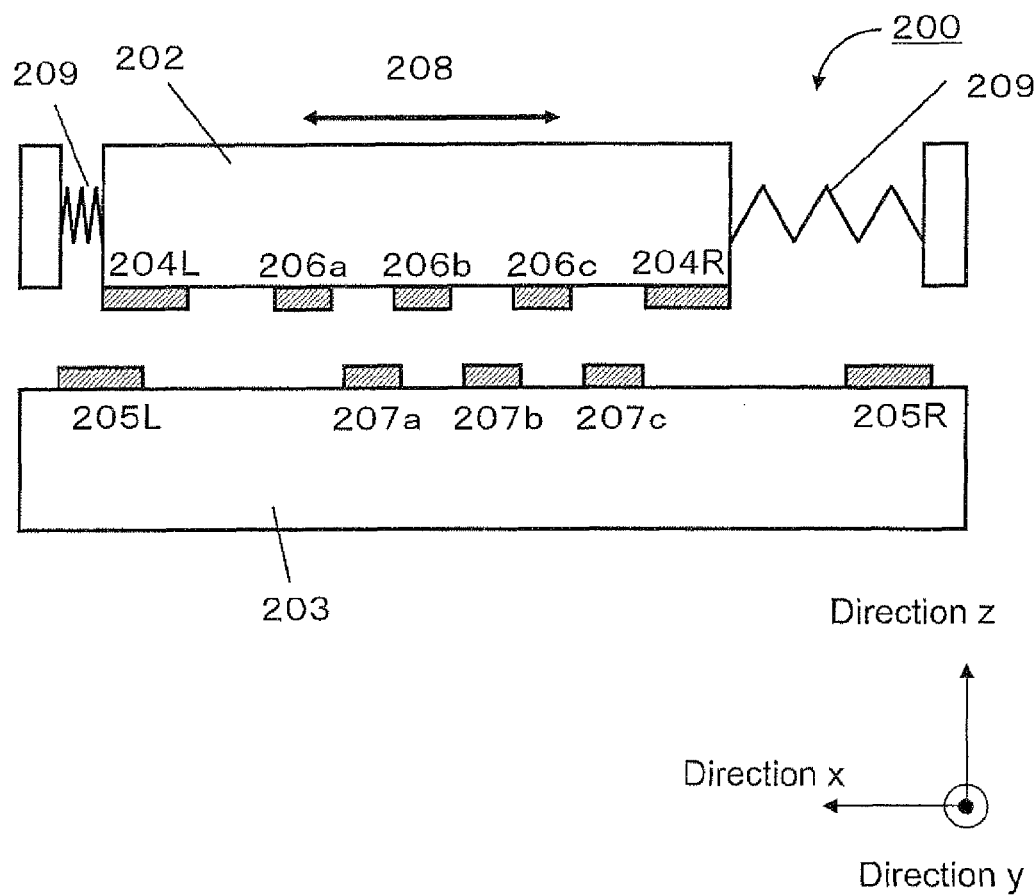
FIG. 5 is a cross-sectional view of a third modified example of the vibration power generator in the first embodiment.

FIG. 5 shows another modified example of this embodiment. FIG. 5 is a cross-sectional view taken along a vibrational direction 208 of a first substrate 202 of a vibration power generator 200. The vibration power generator 200 includes a first substrate 202; third electrodes 204L and 204R and first electrodes 206a, 206h, and 206c formed over a surface of the first substrate 202; a second substrate 203; and fourth electrodes 205L and 205R and second electrodes 207a, 207b, and 207c formed over a surface of the second substrate 203. The vibration power generator 200 differs from the vibration power generator 100 shown in FIG. 1 in that the power generator 200 is combined with a conventional resin spring 209. The combination of the resin spring and the vibration power generator of any of the embodiments of the invention can solve the problem of an increase in amount of displacement in the direction other than the vibrational direction which might be caused by decreasing the spring constant of the spring, thus enabling the more stable power generation in the low-frequency range. Instead of the resin spring, the use of a spring formed of Si or the like can provide the same effects.

Figure 6:
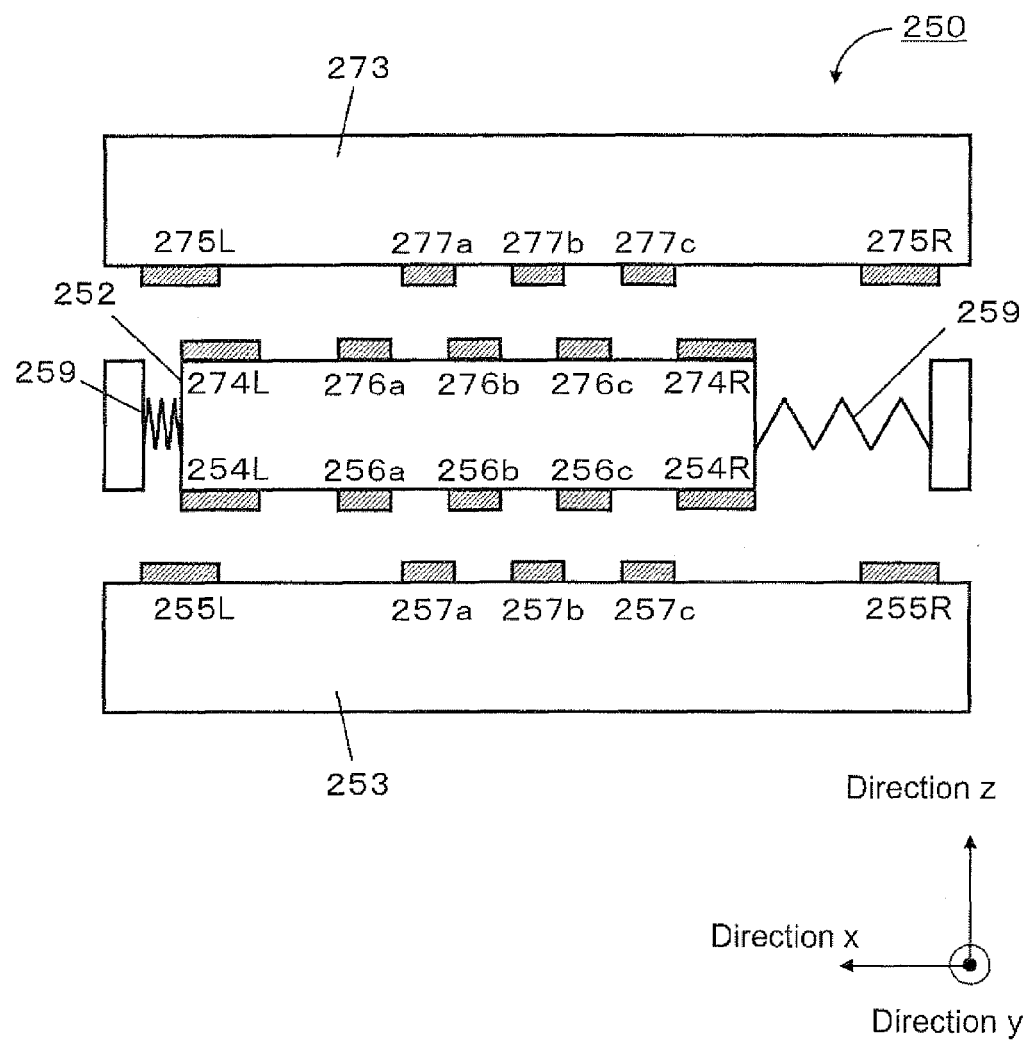
FIG. 6 is a cross-sectional view of a fourth modified example of the vibration power generator in the first embodiment.

FIG. 6 shows a modified example of the vibration power generator shown in FIG. 5. The vibration power generator shown in FIG. 6 presents a cross section taken along the vibrational direction of the first substrate 252 of the vibration power generator 250. The vibration power generator 250 includes a first substrate 252, and two second substrates 253 and 273. The lower-side second substrate is opposed to the first substrate 252 with distance from one main surface of the first substrate 252. The upper-side second substrate 273 is opposed to the first substrate 252 by a distance from the other main surface of the first substrate 252. Over one surface (lower-side surface) of the first substrate 252, the lower-side third electrodes 254L and 254R are formed, and the lower-side first electrodes 256a, 256b, and 256c for power generation are further formed. Over the lower-side second substrate 253, the lower-side fourth electrodes 255L and 255R are formed, and the lower-side second electrodes 257a, 257b, and 257c for power generation are further formed. In the illustrated embodiment, the lower-side first electrodes 256a, 256b, and 256c are electrically charged. Over the other surface (upper surface) of the first substrate 252, the upper-side third electrodes 274L and 274R are formed, and the upper-side first electrodes 276a, 276b, and 276c for power generation are formed. Over the upper-side second substrate 273, the upper-side fourth electrodes 275L, and 275R are formed, and the upper-side second electrodes 277a, 277b, and 277c for power generation are formed. In the illustrated embodiment, the upper-side first electrodes 276a, 276b, and 276c are electrically charged. Further, the vibration power generator 250 is combined with a resin spring 259.

The vibration power generator 250 has both effects given by the vibration power generator 200 shown in FIG. 5, and by the vibration power generator 150 shown in FIG. 4. This embodiment provides the vibration power generator 250 that can stably generate power with respect to the external vibration in the low-frequency range. Further, this embodiment can provide the vibration power generator that can be mounted or installed in a smaller area, or which can output a higher power in the same mounting area, as compared to the structure shown in FIG. 5.

(Second Embodiment)

Figure 7:
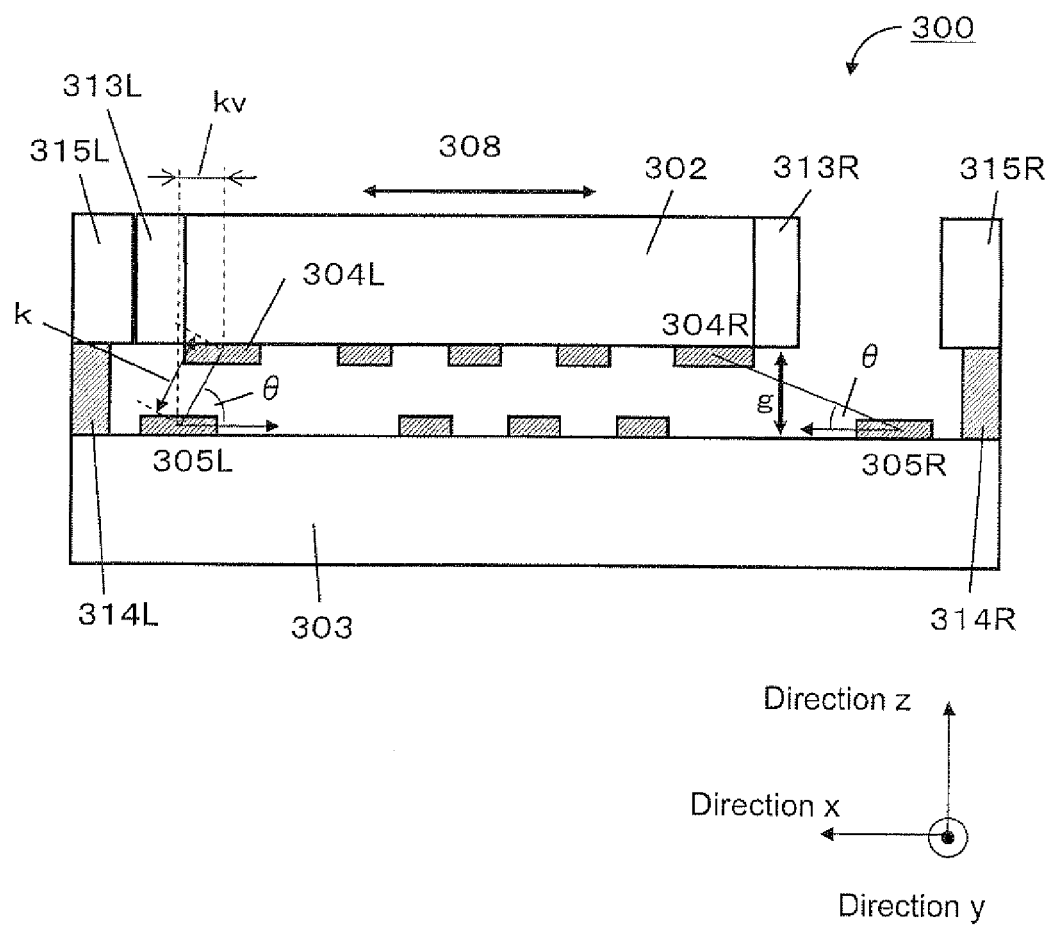
FIG. 7 is a cross-sectional view of a vibration power generator according to a second embodiment.

FIG. 7 is a cross-sectional view (cross-sectional view taken along the vibrational direction 308 of the first substrate 302) of a vibration power generator 300 in the second embodiment. The second embodiment differs from the first embodiment in the following points.

Fixed structures 314L, and 314R are formed over a substrate surface of a second substrate 303.

First stoppers 313L and 313R are formed over both sides of the first substrate 302, and second stoppers 315L and 315R are formed over the fixed structures 314L and 314R so as to be capable of contacting with the first stoppers 313L, and 313R. The first stoppers 313L and 313R, and the second stoppers 315L and 315R restrict the amplitude of the vibration of the first substrate 302 to prevent the increase in amount of displacement of the first substrate 302, as will be described later. In the embodiment shown, the first stoppers 313L and 313R, and the second stoppers 315L and 315R are positioned on a line that is in parallel to the vibrational direction 308 of the first substrate 302.

The first stoppers 313L and 313R are formed of, for example, Si. The first stoppers 313L and 313R may be formed separately from the first substrate 302. Alternatively, the first stoppers 313L and 313R may be integral with the first substrate 302 by forming the third electrodes 304L and 304R inside each end surface (as show in the figure, the left and right end surfaces of the first substrate 302) of the first substrate 302 in the vibrational direction 308. That is, the first substrate 302 itself may be used as a stopper such that the end surface of the first substrate 302 in the vibrational direction 308 can be brought into contact with a second stopper.

The second stoppers 315L and 315R are formed of Si, like the first stopper, and are coupled to fixed structures 314L and 314R comprised of an alloy, such as CuTi. The fixed structures 314L and 314R are fixed to the second substrate 303.

The first stopper 313L (313R) and the second stopper 315L (315R) are provided for the purpose of controlling the displacement of the first substrate 302 in the following manner. In the cross-section shown, an angle θ formed between a segment connecting the centroid of the third electrode 304L (304R) positioned at one end and the centroid of the fourth electrode 305L, (305R) positioned at the one end, and a half line extending from the centroid of the fourth electrode 305L (305R) positioned at the one end in parallel to the main surface of the second substrate 303 toward the third electrode 304L (304R) in a stationary state (that is, toward the fourth electrode positioned at the other end) does not exceed 55 degrees. Specifically, when the first substrate 302 is displaced until the first stopper 313L (313R) comes in contact with the second stopper 315L (315R) as shown in the figure, the first stopper 313L (313R) and the second stopper 315L (315R) are formed in the following manner. That is, a length kv in the substrate vibrational direction of a distance k between the centroid of the third electrode 304L (304R) and the centroid of the fourth electrode 305L (305R) becomes g/tan 55° or more (in which g means a distance between the first substrate 302 and the second substrate 303).

The first stopper 313L, and 313R and the second stoppers 315L and 315R may be formed of a desired material, such as resin and metal. Even in such a case, the effects of this embodiment can be achieved. The fixed structures 314L and 314R can be formed of any material, such as resin or solder.

The operation of a vibration power generator thus formed will be described.

A vibration power generator 300 generates power by displacement of first substrate 302 with respect to the second substrate 303, which displacement is caused by the vibration from the outside, similarly to the vibration power generator 300 shown in FIG. 1. The first substrate 302 is displaced by the vibration from the outside. In the small vibration from the outside, the first substrate 202 is restored to a predetermined position by an electrostatic force. In the large vibration from the outside, the first substrate 202 is stopped by the first stoppers 313L and 313R and the second stoppers 315L and 315R in the position where the angle θ becomes 55 degrees, and then restored to the original position by the electrostatic force. Thus, the first substrate 202 can vibrate such that the angle θ does not exceed 55 degrees.

The above-mentioned structure can obtain the same effects as those provided by the vibration power generator 100 shown in FIG. 1. In the second embodiment, the vibration power generator 300 itself includes the fixed structures 314L and 314R, which are also provided with the second stoppers 315L and 315R that can be in contact with the first stoppers 313L and 313R. That is, the vibration power generator 300 itself includes a member for controlling the displacement of the first substrate 302 so as to generate a high power. Thus, unlike the vibration power generator 100 shown in FIG. 1, a member (for example, the casing) which is independent from the power generator is not required to control the vibration of the first substrate. This reduces the restrictions on the shape and size of the casing, and restrictions on a device to which the vibration power generator is applied.

Figure 10:
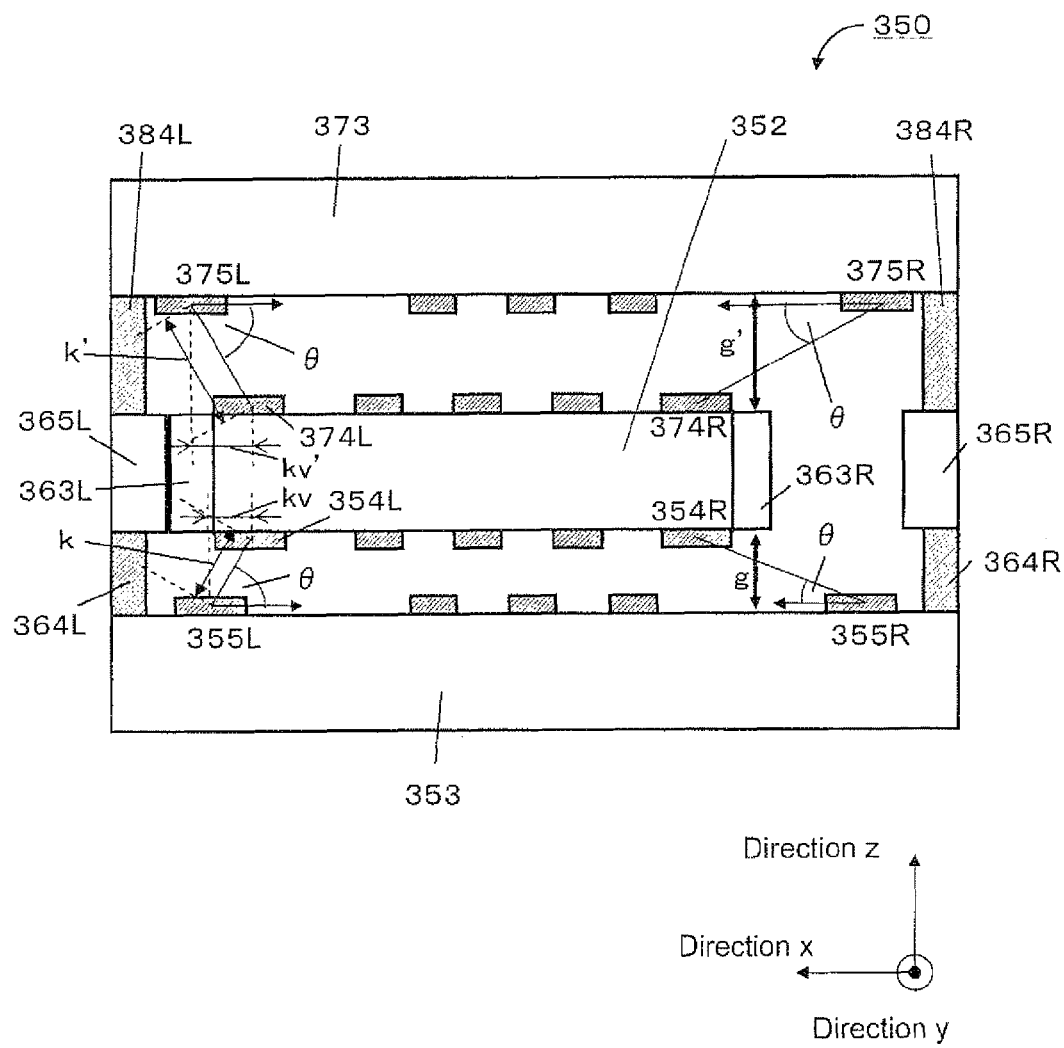
FIG. 10 is a cross-sectional view of a first modified example of the vibration power generator in the second embodiment.

A modified example of this embodiment is shown in FIG. 10. FIG. 10 shows a cross-sectional view taken along the vibrational direction (the direction x) of a first substrate 352 of a vibration power generator 350. The vibration power generator 350 includes a first substrate 352, and two second substrates 353 and 373. The lower-side second substrate 353 is opposed to the first substrate 352 with distance from one main surface of the first substrate 352. The upper-side second substrate 373 is opposed to the first substrate 352 with distance from the other main surface of the first substrate 352. Lower-side third electrodes 354L, and 354R are formed over one surface (lower-side surface) of the first substrate 352. Lower-side fourth electrodes 355L and 355R are formed over the lower-side second substrate 353. Upper-side third electrodes 374L, and 374R are formed over the other surface (upper-side surface) of the first substrate 352. Upper-side fourth electrodes 375L and 375R are formed over the upper-side second substrate 373.

In the vibration power generator 350, first stoppers 363L and 363R are formed over both ends of the first substrate 352. The lower-side second substrate 353 and the upper-side second substrate 373 are provided with lower-side fixed members 364L and 364R, and upper-side fixed members 384L and 384R, respectively. Second stoppers 365L and 365R are connected to the these fixed members.

Referring to FIG. 10, g that is a distance between the first substrate 352 and the lower-side second substrate 353 differs from g' that is a distance between the first substrate 253 and the upper-side second substrate 373, and g and g' satisff g<g'. Accordingly, g/tan 55° differs from g'/tan 55°. In this case, the lower-side and upper-side third electrodes and the lower-side and upper-side fourth electrodes are arranged and the first stopper and the second stopper are formed in the following way. That is, a length kv which is a length in the vibrational direction (in the direction x shown in the figure) of a distance k of a segment connecting the centroid of the lower-side third electrode 354L (354R) and the centroid of the lower-side fourth electrode 355L (355R), is equal to or more than g/tan 55°. And a length kv' which is a length in the vibrational direction of a distance k' of a segment connecting the centroid of the upper-side third electrode 374L (374R) and the centroid of the upper-side fourth electrode 375L (375R) is equal to or more than g'/tan 55°. For example, as shown in FIG. 10, when the third electrodes and the fourth electrodes are arranged such that the relationship of kv'>kv is satisfied while the first substrate 352 remains stationary and vibrates, the first stopper and the second stopper are formed in such a manner that the kv is equal to or more than g/tan 55°. Since the kv' is more than kv, the relationship of kv'≥g/tan 55° is satisfied in the case of the kv≥g/tan 55°.

The vibration power generator 350 has both effects of the vibration power generator 300 shown in FIG. 7 and the vibration power generator 150 shown in FIG. 4. Thus, the vibration power generator 350 can control the vibration of the first substrate 352 by the stopper integrally provided with the vibration power generator, and also can be installed in a small area. Alternatively, the vibration power generator can output a high power as compared to the structure shown in FIG. 7 when mounted in the same area.

Figure 11:
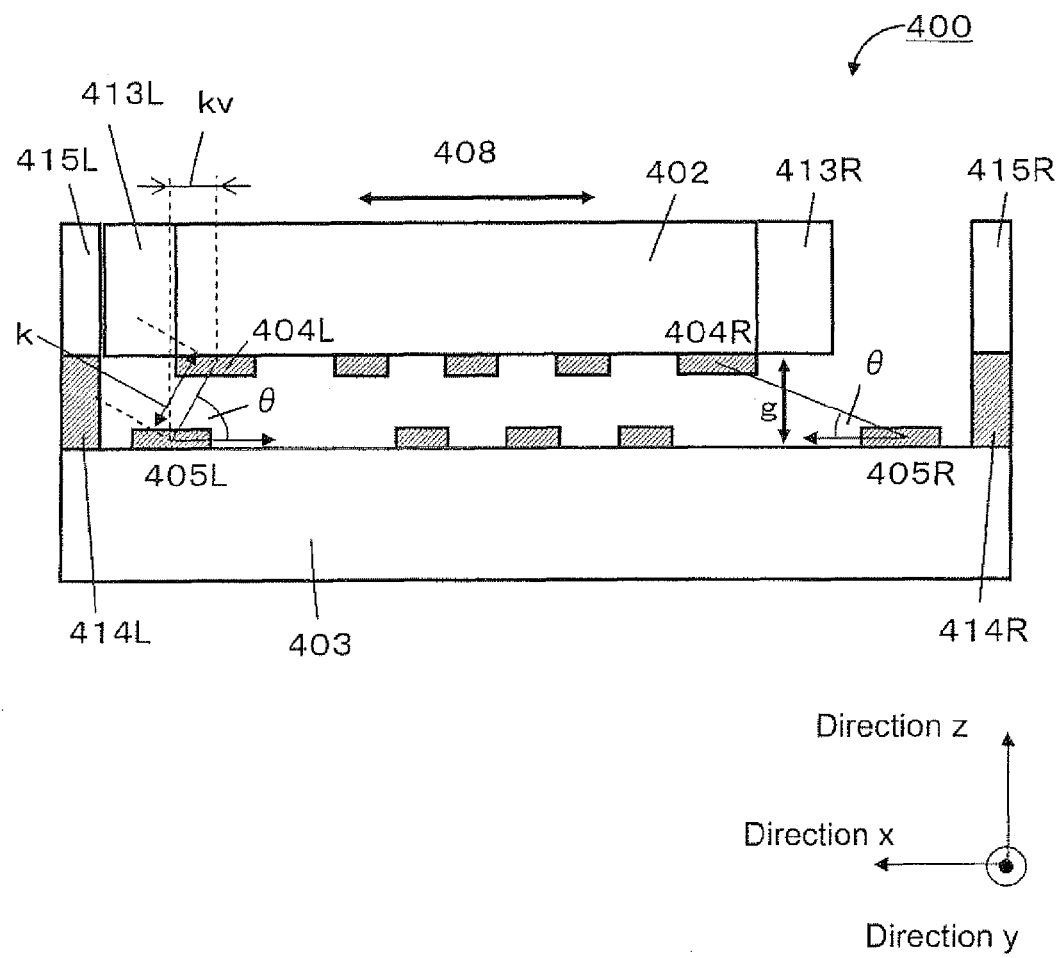
FIG. 11 is a cross-sectional view of a second modified example of the vibration power generator in the second embodiment.

Another modified example of this embodiment is shown in FIG. 11. A vibration power generator 400 shown in FIG. 11 is the same as the vibration power generator 300 shown in FIG. 7 except for the shape of the second stoppers 415L and 415R. In FIG. 11, the same member or element as that shown in FIG. 10 is designated by reference numeral of 4 in the hundreds place with the same digits in the tens and ones places as those shown in FIG. 10.

In the vibration power generator 400 shown in FIG. 11, the second stoppers 415L and 415R are of the structure wherein each of faces opposed to the first stopper 413L and 413R, forms one surface together with the inner surface of each of the fixed structures 414L and 414R. In a modified example of the vibration power generator shown in FIG. 11, the fixed structures 414L and 414R may form the second stoppers 415L and 415R, forming integral structures. In that case, the same effects as those of the vibration power generator shown in FIG. 7 can be obtained.

Figure 12:
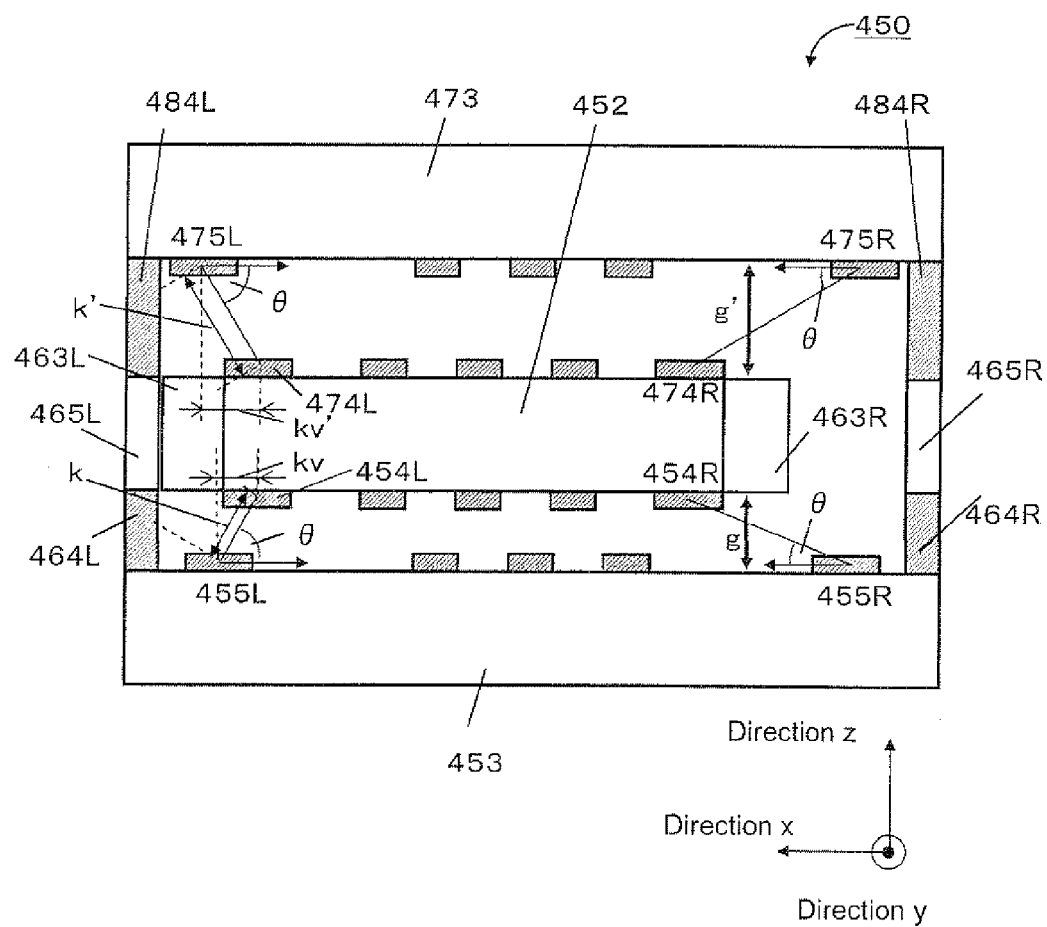
FIG. 12 is a cross-sectional view of a third modified example of the vibration power generator in the second embodiment.

The modified example of the vibration power generator 400 shown in FIG. 11 is shown in FIG. 12. A vibration power generator 450 shown in FIG. 12 is the same as the vibration power generator 350 shown in FIG. 10 except for the shape of each of the second stoppers 465L and 465R. In FIG. 12, the same member or element as that shown in FIG. 10 is indicated by reference number of 4 in hundreds place with the same digits in tens and ones places as those shown in FIG. 10. The shape of the second stopper of the vibration power generator 450 shown in FIG. 12 is the same as each of the second stoppers 415L and 415R shown in FIG. 11. The vibration power generator 450 shown in FIG. 12 has both the effects of the vibration power generator 400 shown in FIG. 11 and the vibration power generator 350 shown in FIG. 10.

Figure 13:
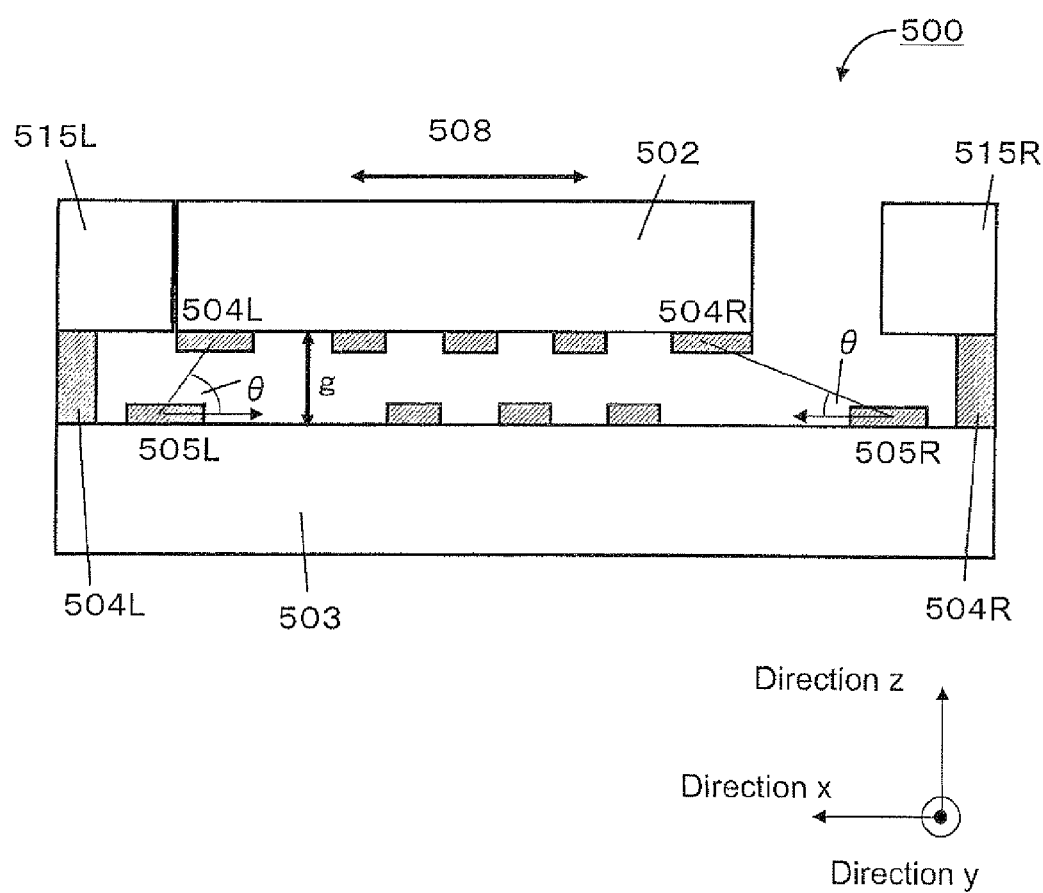
FIG. 13 is a cross-sectional view of a fourth modified example of the vibration power generator in the second embodiment.

A further another example of this embodiment is shown in FIG. 13. A vibration power generator 500 shown in FIG. 13 is the same as the vibration power generator 300 shown in FIG. 9 except for the fact that no first stopper is provided, and for the shape of each of the second stoppers 515L and 515R. In FIG. 11, the same member or element as that shown in FIG. 10 is designated by reference numeral of 5 in the hundreds place with the same digits in the tens and ones places as those shown in FIG. 10. As shown in FIG. 13, no stoppers are formed on both ends of the first substrate 502, or no part serving as a stopper is provided in the first substrate 502, and only the second stoppers 515L and 515R are formed. Even such structure gives the same effects as those of the vibration power generator shown in FIG. 7. In the vibration power generator shown in FIG. 13, third electrodes 504L and 504R are formed at both ends of the first substrate 502 and both end surfaces of the first substrate 502 are to be brought into contact with the second stoppers 515L and 515R. In this embodiment without the first stopper, since one end surface of the first substrate is flush with the end surface of the third electrode, the second stoppers 515L and 515R are larger in size than the second stoppers 315L and 315R shown in FIG. 7.

Figure 14:
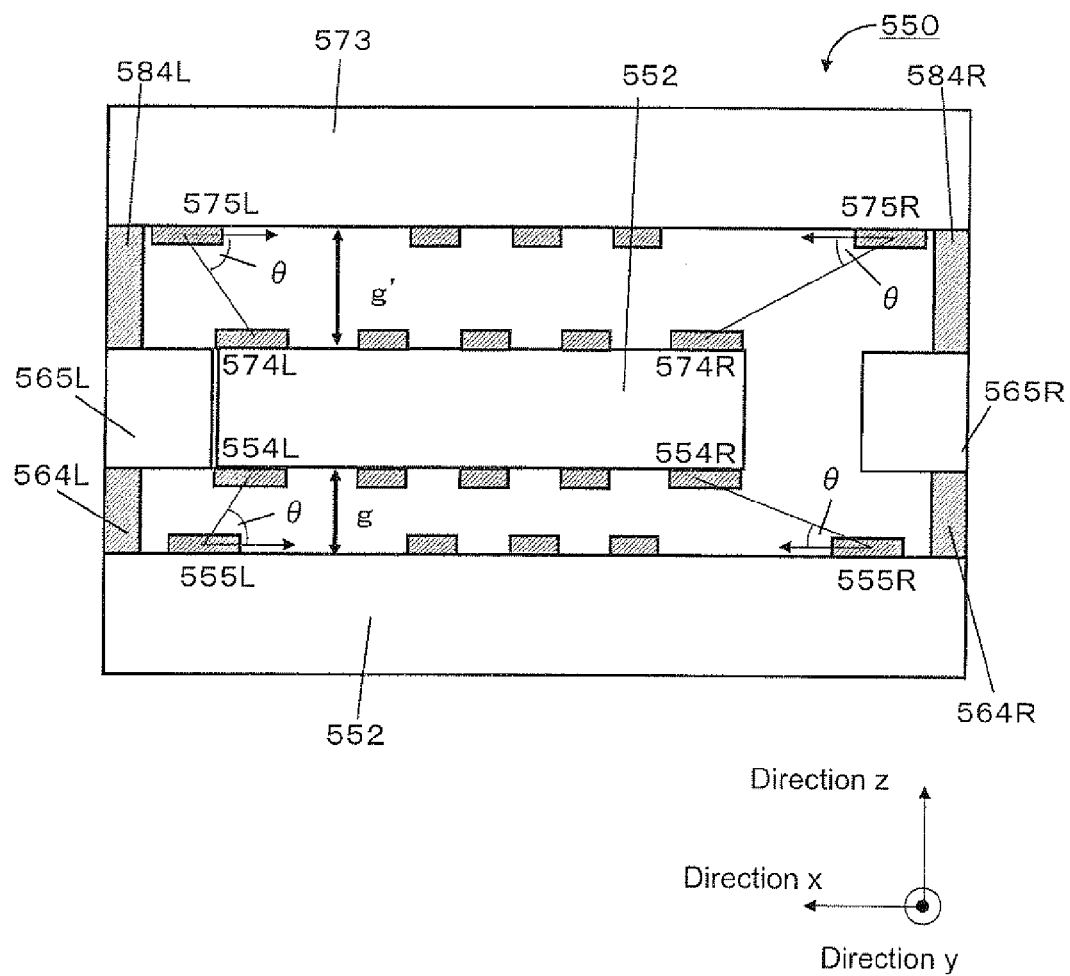
FIG. 14 is a cross-sectional view of a fifth modified example of the vibration power generator in the second embodiment.

A modified example of the vibration power generator 500 shown in FIG. 13 is shown in FIG. 14. A vibration power generator 550 shown in FIG. 14 is the same as the vibration power generator 350 shown in FIG. 10 except that the first stopper is not formed, and except for the shape of the second stoppers 565L and 565R. In FIG. 14, the same member or element as that shown in FIG. 10 is designated by reference numeral of 5 in hundreds place with the same digits in tens and ones places as those shown in FIG. 10. The second stopper in the vibration power generator 550 shown in FIG. 14 has the same structure as the second stoppers 515L and 515R shown in FIG. 13. The vibration power generator 550 shown in FIG. 14 has both effects of the vibration power generator 500 shown in FIG. 13, and the vibration power generator 350 shown in FIG. 10.

(Third Embodiment)

Figure 16A:
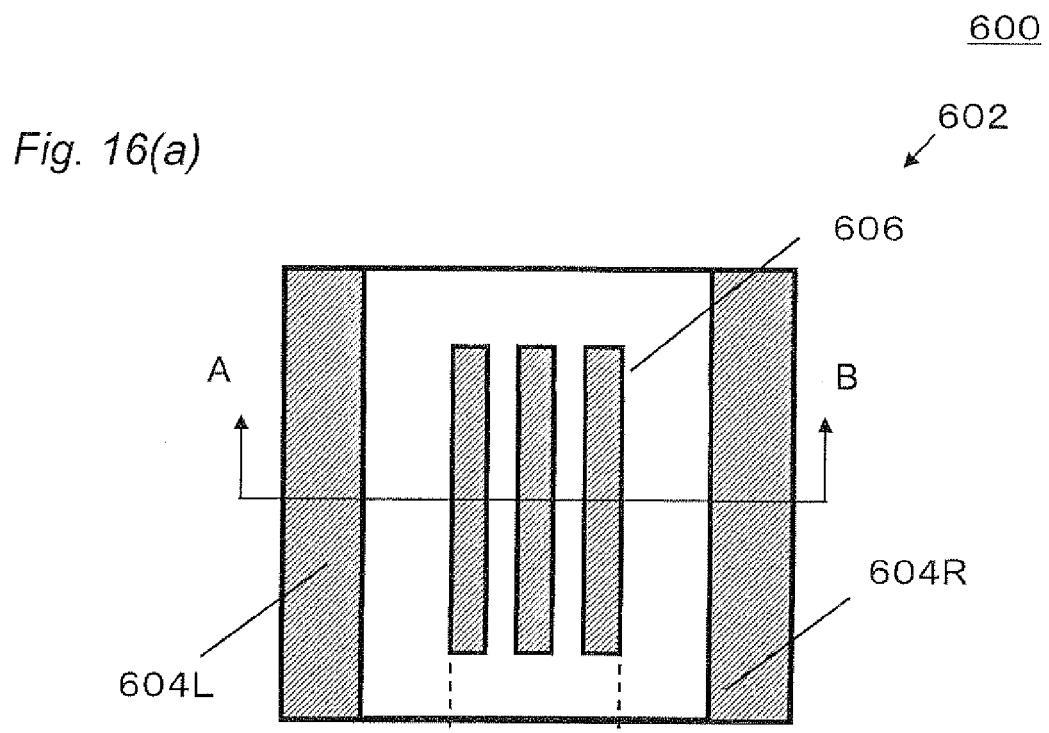
FIG. 16(a) and FIG. 16(b) are top views showing a first substrate and a second substrate of the vibration power generator in the third embodiment, respectively.
Figure 16B:
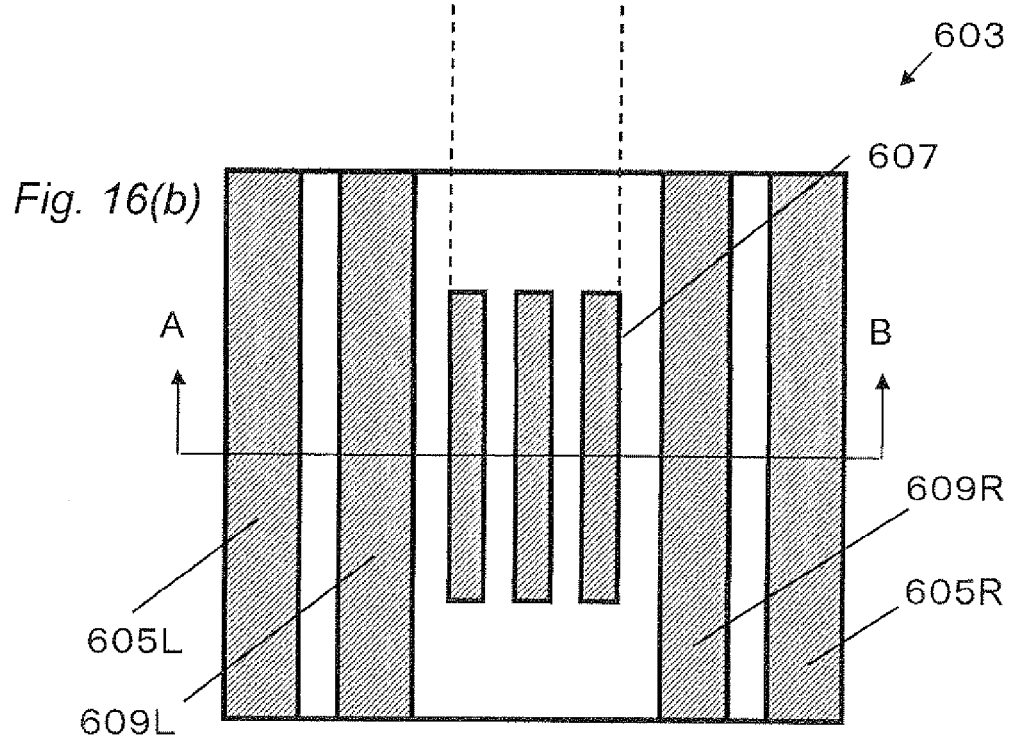

FIG. 15 is a cross-sectional view of a vibration power generator 600 according to a third embodiment. FIGS. 16(a) and 16(b) are plan views of a first substrate and a second substrate of the vibration power generator 600 shown in FIG. 15, respectively. The cross-section shown in FIG. 15 corresponds to the cross-section taken along the line A-B of FIG. 16.

This embodiment differs from the first embodiment in that fifth electrodes 609L and 609R are formed over a second substrate 603. In FIG. 15, the same member or element as that shown in FIG. 1 is designated by reference numeral of 6 in hundreds place with the same digits on tens and ones places as those shown in FIG. 1. As shown in FIG. 15, a fifth electrodes 609L (609R) is formed on the center side of the second substrate as compared to the fourth electrode 605L (605R).

The fifth electrode 609L holds the charge of the same polarity as that of the charge held by the third electrode 604L and the fourth electrode 605L. The same goes for the fifth electrode 609R. Also, in this vibration power generator 600, the vibration of the first substrate 602 is controlled in the following way. An angle θ' formed between a segment connecting the centroid of the third electrode 604L (604R) positioned on one end and the centroid of the fifth electrode 609L (609R) on the one end, and a half line extending from the centroid of the fifth electrode 609L(609R) positioned on the one end in parallel to the main surface of the second substrate 603 toward the third electrode 604L (604R) in the stationary state (that is, the fourth electrode positioned on the one end) does not exceed 55 degrees.

The angle θ' will be specifically described below.

The angle θ' as used herein means an angle formed between a segment connecting the centroid of the third electrode 604L in the stationary state and the centroid of the fifth electrode 609L, and a half line extending from the centroid of the fifth electrode 609L toward the fourth electrode 605L in parallel to the main surface of the second substrate 103. Further, the angle θ' as used herein means an angle θ formed between a segment connecting the centroid of the third electrode 604R in the stationary state and the centroid of the fifth electrode 609R, and a half line extending from the centroid of the fifth electrode 609R toward the fourth electrode 605R in parallel to the main surface of the second substrate 103.

With this structure, when the first substrate 602 is displaced, for example, leftward in the figure, the electrostatic force in the direction z is generated not only near the end surface in the displacement direction (left end surface in the figure), but also near an end surface in the direction opposite to the displacement direction (right end surface in the figure). Thus, a first substrate 602 can be more stably vibrated.

Figure 17A:
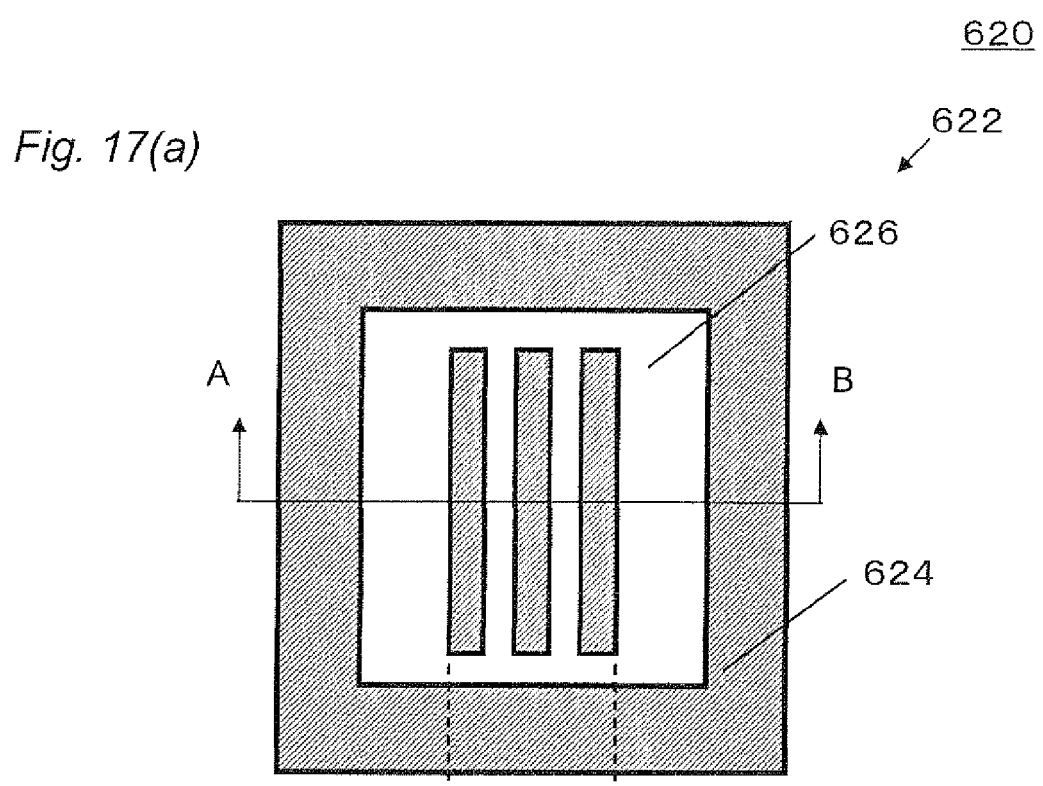
FIG. 17(a) and FIG. 17(b) are top views showing a first substrate and a second substrate of a first modified example of the vibration power generator in the third embodiment.
Figure 17B:
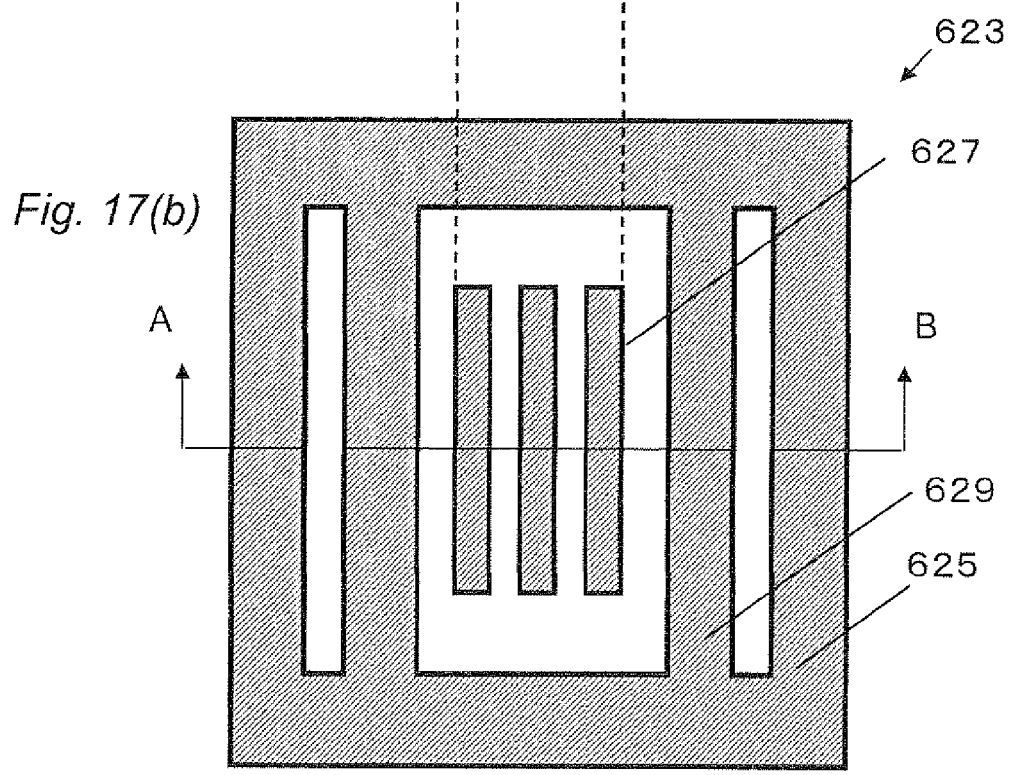

In this embodiment, as shown in FIG. 16, the fifth electrodes 609L and 609R are formed in a strip-like shape at both ends of the second substrate 603 in the vibrational direction (the direction x). In a modified example of this embodiment, as shown in FIGS. 17(a) and 17(b), a third electrode 624 and a fourth electrode 625 may cover the surroundings of a first substrate 622 and a second substrate 627, and a fifth electrode 629 may also surround the periphery of a group of second electrodes 627. FIG. 17 shows a first electrode 626 and a second electrode 627. The arrangement of these electrodes is the same as that of the first electrode 106 and the second electrode 107 shown in FIGS. 1 and 2. Also, the vibration power generator including the third, fourth, and fifth electrodes shown in FIG. 17 can obtain the same effects as that of the generator shown in FIG. 11. The use of this structure generates the force to restore the substrate to the vicinity of the center of the structure even when the substrate is displaced in the direction other than the vibrational direction, which advantageously enables the vibration power generator 620 to operate more stably.

Figure 18:
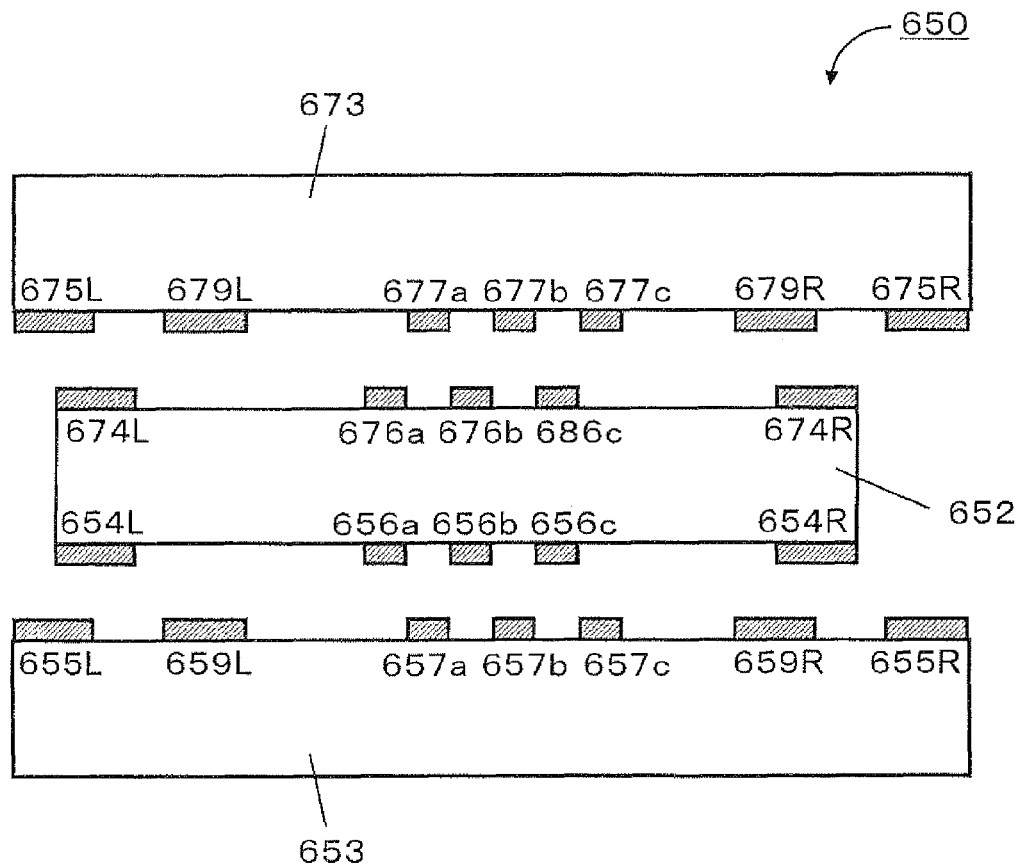
FIG. 18 is a cross-sectional view of a second modified example of the vibration power generator in the third embodiment.

A modified example of the vibration power generator 600 shown in FIG. 15 is illustrated in FIG. 18. A vibration power generator 650 shown in FIG. 18 is the same as the vibration power generator 150 shown in FIG. 4 except for the presence of lower-side fifth electrodes 659L, and 659R and the upper-side fifth electrodes 679L and 679R. In FIG. 18, the same member or element as that shown in FIG. 4 is designated by reference numeral of 6 in the hundreds place with the same digits in the tens and ones places as those shown in FIG. 4. The vibration power generator 650 shown in the figure have both effects of the vibration power generator 400 shown in FIG. 4 and the vibration power generator 600 shown in FIG. 15.

(Fourth Embodiment)

Figure 19:
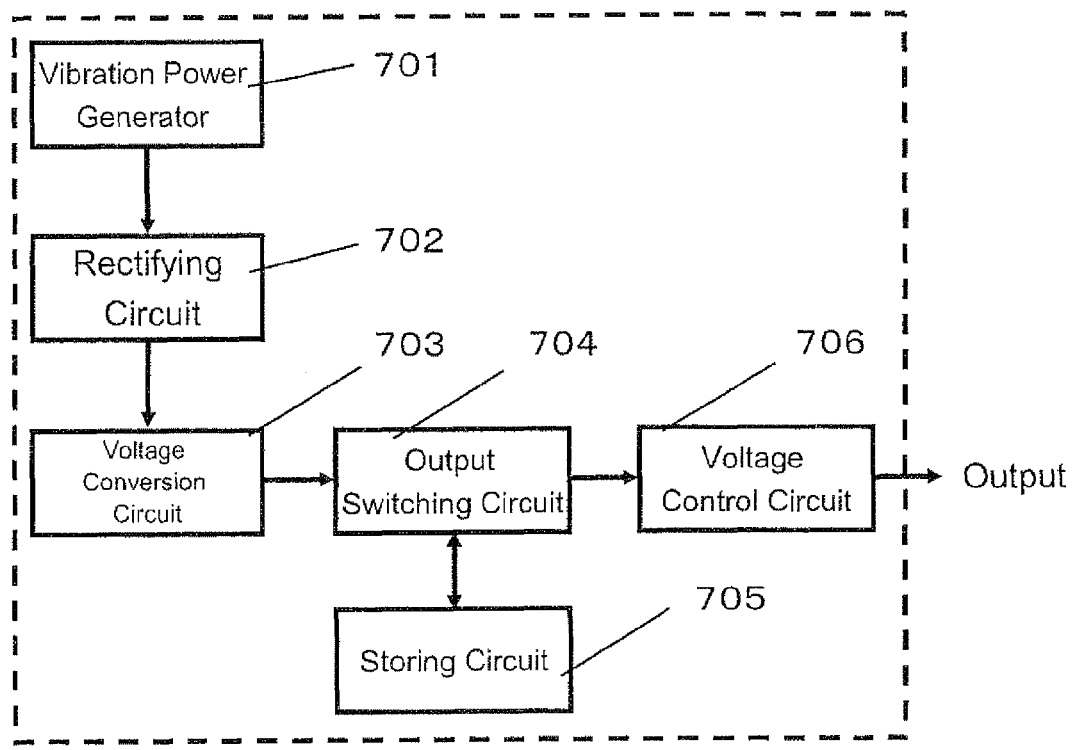
FIG. 19 is a block diagram showing a vibration power generation apparatus according to a fourth embodiment.

A vibration power generation apparatus will be described below as a fourth embodiment. FIG. 19 is a block diagram of a vibration power generation apparatus 700 according to this embodiment. A vibration power generator 701 shown in FIG. 19 is any one of the vibration power generators according to the first to third embodiments.

Referring to FIG. 19, the vibration power generation apparatus 700 includes the vibration power generator 701, a rectifying circuit 702, a voltage conversion circuit 703, an output switching circuit 704, a storage circuit 705, and a voltage control circuit 706. An AC voltage output from the vibration power generator 701 is converted into a DC voltage by the rectifying circuit 702. The DC voltage is input to the voltage conversion circuit 703 and converted into a level of an output voltage of the vibration power generation apparatus 700. The converted voltage is input to the voltage control circuit 706 or the storage circuit 705 by the output switching circuit 704. The voltage control circuit 706 controls the output voltage at a certain level.

Now, the operation of the vibration power generation apparatus 700 with the above structure will be described below with reference to FIG. 20.

Figure 20A:
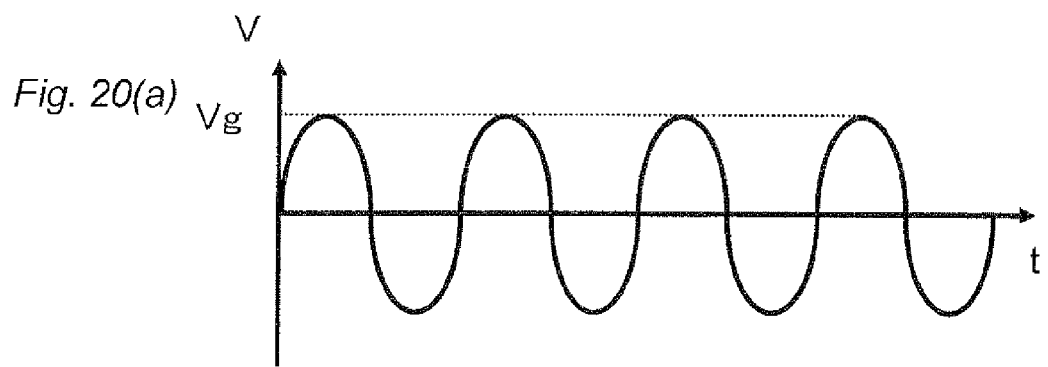
FIG. 20(a), FIG. 20(b) and FIG. 20(c) are graphs showing voltage waveforms at the respective components of the vibration power generation apparatus in the fourth embodiment.
Figure 20B:
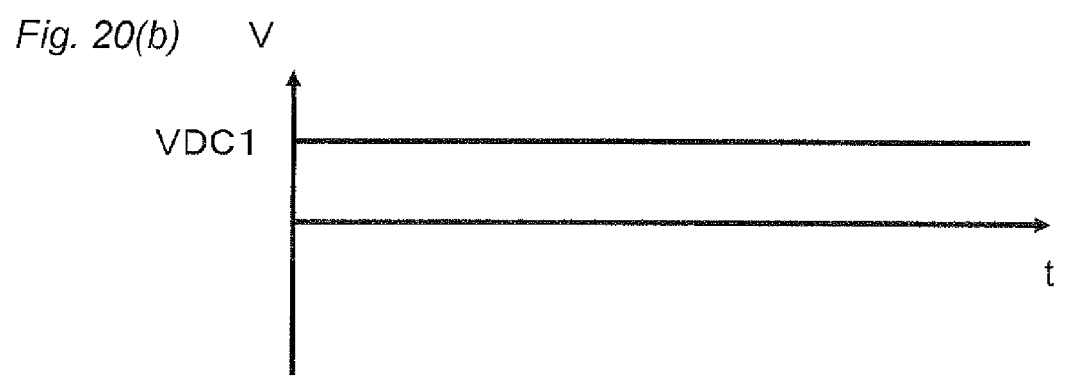
Figure 20C:
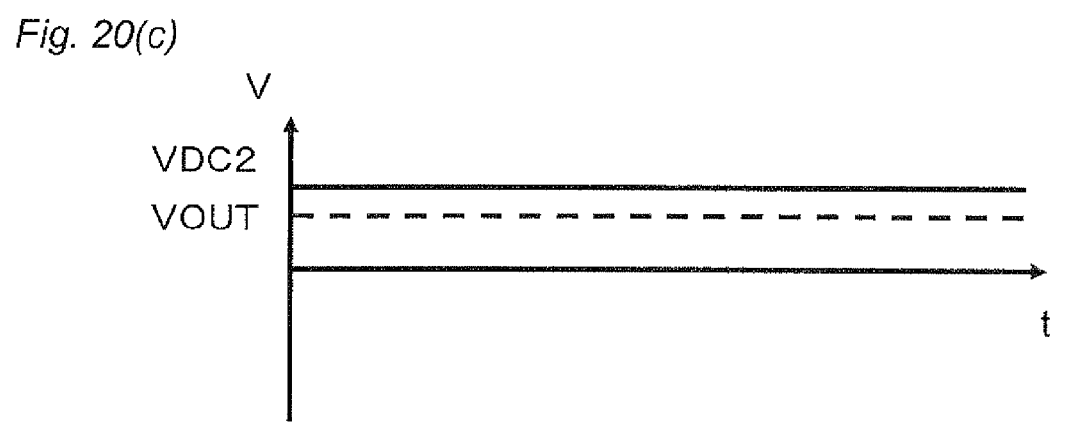

FIGS. 20(a), 20(b), and 20(c) each show a voltage waveform of each part of the vibration power generation apparatus 700. FIG. 20(a) is an output voltage waveform of a vibration power generator 701. In this embodiment, for simplification, it is suggested that even when the displacement direction of the first substrate is changed, the power generation is effectively performed. At this time, a sinusoidal voltage is output by fluctuations in overlapped area due to the vibration output. The output voltage from the vibration power generator 701 has a voltage amplitude Vg which depends on the vibration amplitude of the first substrate, a gap between the first and second substrates, an amount of charge held by an electret film, and an external impedance viewed from the vibration power generator 701. The AC voltage output from the vibration power generator 701 is converted into a DC voltage VDC1 by the rectifying circuit 702 (see FIG. 20(b)). The VDC1 is converted to an output voltage level VDC2 of the vibration power generation apparatus 700 by the voltage conversion circuit 703. The switching operation of the switching circuit 704 is made in such a manner that; when the output of the voltage from the vibration power generation apparatus 700 is not required, the generated power is stored in the storing circuit 705 without outputting to the voltage control circuit 706; and when the output of the voltage from the vibration power generation apparatus 700 is required and the power generation is small, the power stored in the storing circuit 705 is output. The output from the output switching circuit 704 is controlled to a desired output voltage VOUT by the voltage control circuit 706 (see FIG. 20(c)).

As mentioned above, the voltage output from the vibration power generator 701 is changed due to various factors. For adapting to this change, the voltage VDC2 is desirably set to a slightly higher level than the voltage VOUT finally output. Such setting can make the output voltage constant even in fine fluctuations in voltage. For example, the case of outputting a voltage of 1.8V will be described below. When the VDC2 is set to 1.8V, the decrease in output voltage from the vibration power generator also decreases the output voltage from the vibration power generation apparatus 701. For example, when the VDC2 is set to 2V, control can be sufficiently made for the decrease in voltage by 0.2 V of the power generator. This is very advantageous from the viewpoint of practical use.

Figure 21:
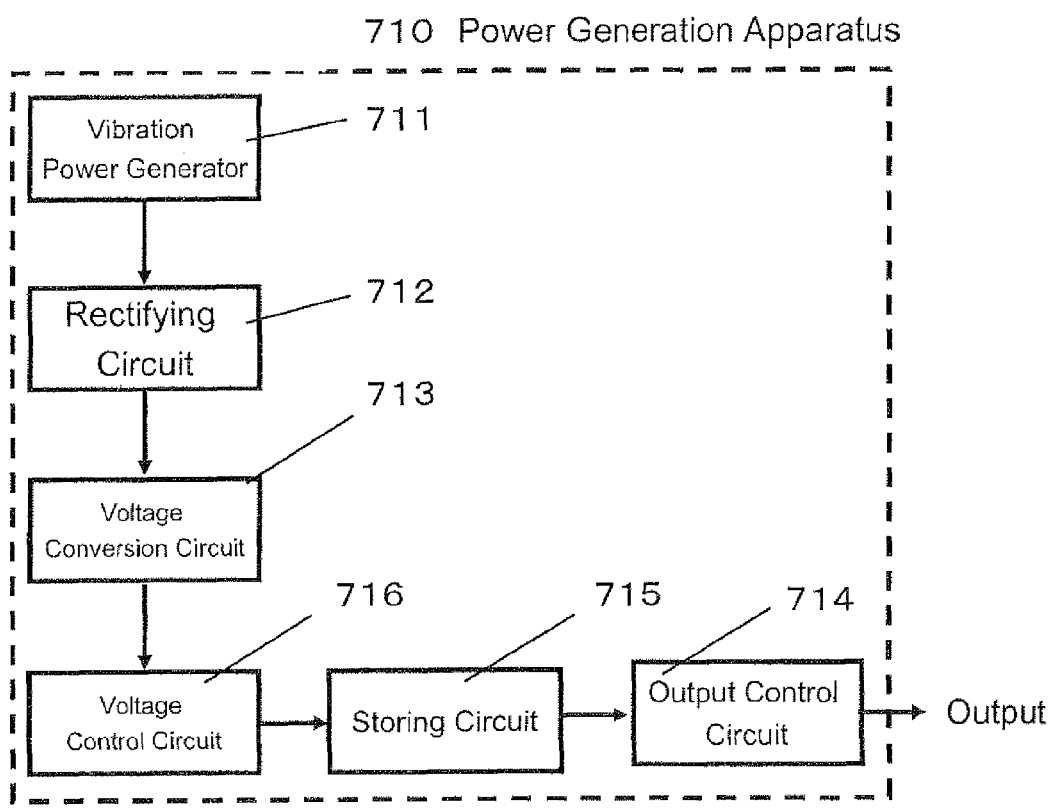
FIG. 21 is a block diagram showing another structure of the vibration power generation apparatus according to the fourth embodiment.

FIG. 21 is a block diagram showing a vibration power generation apparatus 710 with another structure according to this embodiment.

Referring to FIG. 21, a vibration power generator 710 is the vibration power generator according to any one of the first to tenth embodiments.

The vibration power generation apparatus 710 includes the vibration power generator 711, a rectifying circuit 712, a voltage conversion circuit 713, an output control circuit 714, a storage circuit 715, and a voltage control circuit 716. The AC voltage output from the vibration power generator 711 is converted into the DC voltage by the rectifying circuit 712. The DC voltage is input to the voltage conversion circuit 713, and converted into a voltage level that can control the voltage of the vibration power generation apparatus 710. The converted voltage is controlled to a desired voltage by the voltage control circuit 716 and input to the storing circuit 715. The output control circuit 714 controls the output of power stored in the storing circuit 715 according to a load.

It is apparent that the vibration power generation apparatus 710 with such a structure also has the same effects as the vibration power generation apparatus 700.

The operation of the vibration power generation apparatus 710 is substantially the same as the vibration power generation apparatus 700. The output voltage from the voltage control circuit 716 is controlled to an optimal voltage for the storing circuit 715. The output control circuit 714 controls the output from the vibration power generation apparatus 710 depending on the load.

(Fifth Embodiment)

Figure 22:
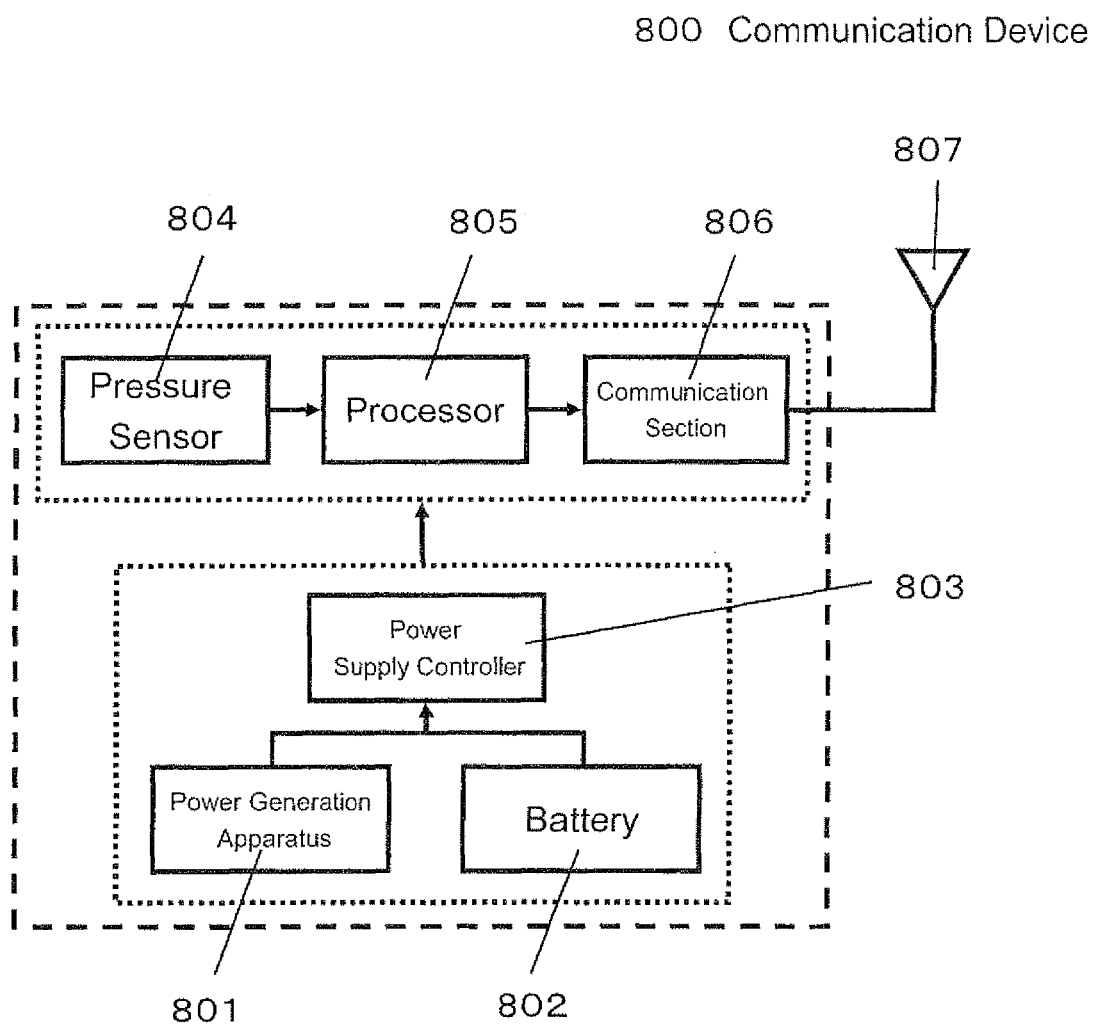
FIG. 22 is a block diagram showing a communication device according to a fifth embodiment, wherein the vibration power generation apparatus is used.

FIG. 22 is a block diagram of a communication device 800 for use in a tire air pressure monitoring system mounted on a vehicle. Referring to FIG. 22, a power generation apparatus 801 corresponds to the vibration power generation apparatus shown in the eleventh embodiment.

As shown in FIG. 22, the communication device 800 includes: the power generation apparatus 801 for generating power due to the vibration; a battery 802 serving as a main power supply of the communication device or a sub-power supply of the power generation apparatus 801; a power supply controller 803 for switching between an output from the power generation apparatus 801 and an output from the battery 802 to supply the output to a circuit section; a pressure sensor 804 for measuring the pressure of air of the tire; a processor 805 for processing the output from the pressure sensor to send the output to a communication section; the communication section 806 for converting an input signal from the processor 805 into a high frequency signal to transfer the signal to an antenna 807, and the antenna 807.

The operation of the communication device 800 with the above structure will be described below.

The power necessary for operation of the pressure sensor 804, the processor 805, and the communication section 806, is supplied from the power generation apparatus 801 or battery 802 by the power supply controller 803. The pressure sensor 804 measures the pressure of air of the tire, and converts the result of measurement into a voltage signal, which is input to the processor 805. The signal processed by the processor 805 is input to the communication section 806 and a high-frequency signal is transmitted from the antenna 807.

The use of the vibration power generation apparatus as a power supply for the communication device in this way can reduce the number of maintenance operations, including battery replacement, or can eliminate the battery replacement, which has a great advantage from the viewpoint of practical use.

This embodiment has described the example of using both the vibration power generation apparatus and the battery. When the output power from the vibration power generation apparatus can sufficiently cover the power to be consumed in the pressure sensor, the processor, and the communication section, as well as the power required for communication, only the vibration power generation apparatus may be used without using the battery. In that case, the battery and the power supply controller are not required, which is advantageous in reduction in the size of the device.

This embodiment has described the example of using any one of the vibration power generators and vibration power generation apparatus described in the first to fourth embodiments. Apparently, any one of other embodiments can also give the same effects.

(Sixth Embodiment)

Figure 23:
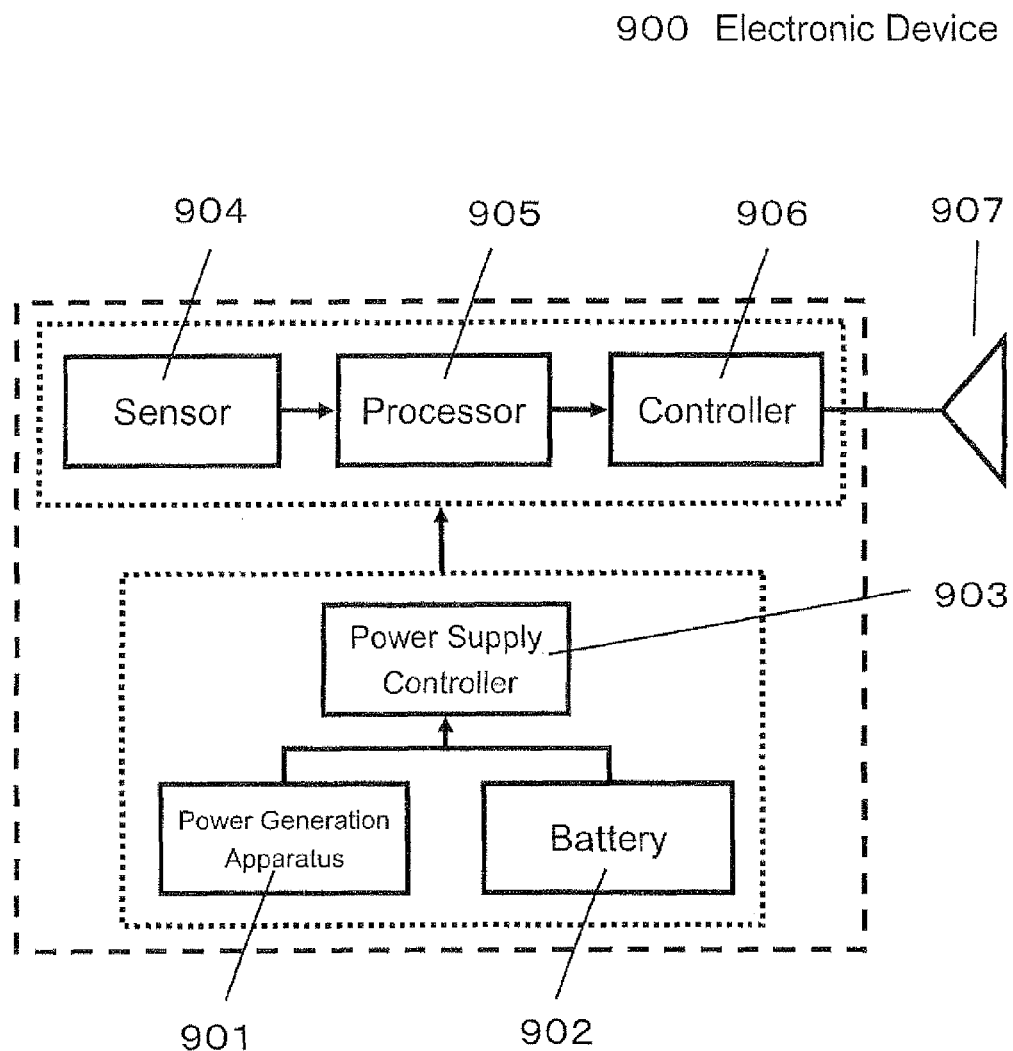
FIG. 23 is a block diagram showing an electronic device according to a sixth embodiment, wherein the vibration power generation apparatus is used.
Figure 24:
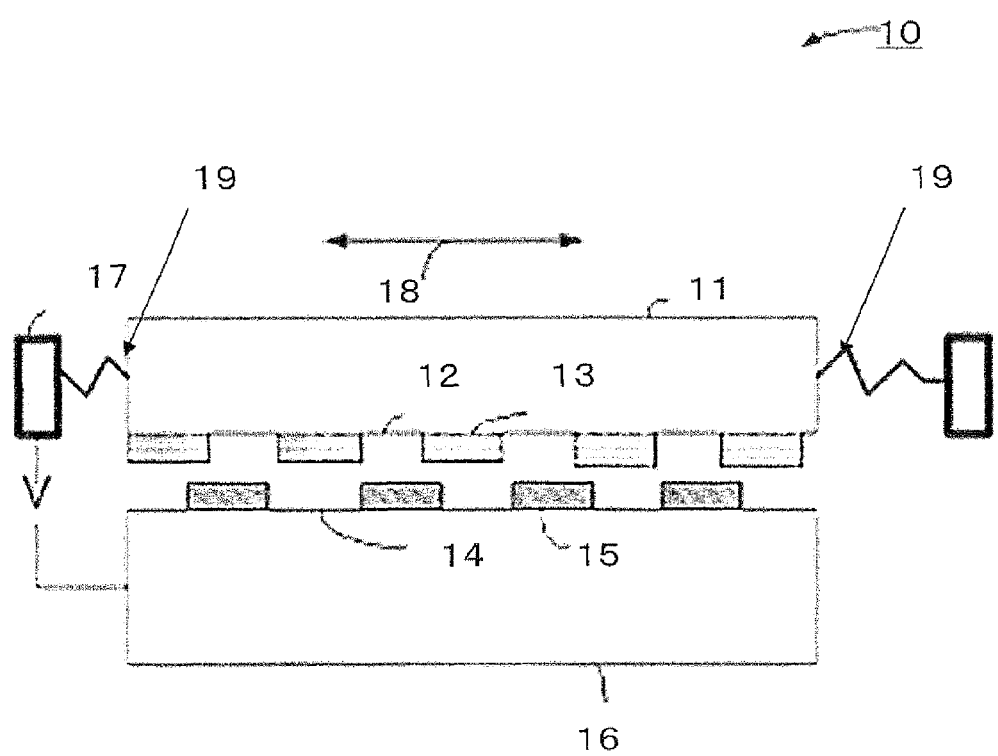
FIG. 24 is a cross-sectional view of a conventional electrostatic induction vibration power generator.
Figure 25:
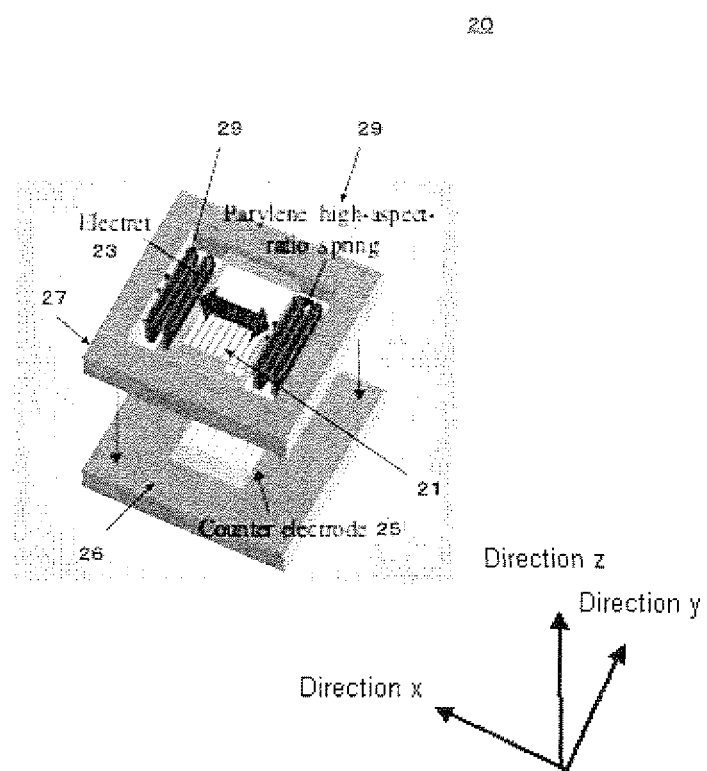
FIG. 25 is a perspective view of the conventional electrostatic induction vibration power generator using a resin spring.

FIG. 23 is a block diagram of an electronic device 900 that makes sound and is mounted in a toy or the like. Referring to FIG. 23, a power generation apparatus 901 is a vibration power generation apparatus according to the third embodiment.

Referring to FIG. 23, the electronic device 900 includes: a power generation apparatus 901 for generating power by vibration; a battery 902 serving as a main power supply for a communication device, or a sub-power supply for the power generation apparatus 901; a power supply controller 903 for switching among an output from the power generation apparatus 901 and an output from the battery 902 to supply the power to a circuit section; a sensor 904 for detecting a response from the outside (for example, a button push, or a tilt of the device, or the like); a processor 905 for processing the output from the sensor to transfer the output to a controller 905; the controller 906 for transmitting an input signal from the processor 905 to a speaker 907; and the speaker 907.

The operation of the communication device (electronic device) 900 with the above structure will be described below. The power necessary for operation of the sensor 904, the processor 905, and the controller 906 is supplied from the power generation apparatus 901 or battery 902 by the power supply controller 903. The sensor 904 detects a response from the outside and inputs the detected result to the processor 905. When a signal processed by the processor 905 exceeds a desired level, the signal is input to the controller 906 to produce sound from the speaker 907.

In this way, the use of the vibration power generation apparatus as a power supply for the electronic device can reduce the number of maintenance operation, including battery replacement, or can eliminate the battery replacement, which has a great advantage from the viewpoint of practical use.

This embodiment shows the example of using both the vibration power generation apparatus and the battery. When the output power from the vibration power generation apparatus can sufficiently cover the power to be consumed in the pressure sensor, the processor, and the communication section, and the power required for communication, only the vibration power generation apparatus may be used without using the battery. In that case, the battery and the power supply controller are not required, which is advantageous in reduction in the size of the device.

This embodiment shows an example of using the vibration power generator or vibration power generation apparatus described in the first to fifth embodiments. Apparently, any one of other embodiments can also give the same effects.

The embodiments disclosed herein are in all respects merely embodiments and should in no way be construed as limiting. The scope of the invention is indicated not by the foregoing description but by the scope of the claims for patent, and is intended to include all modifications that are within the scope and meanings equivalent to the scope of the claims for patent.

Industrial Applicability

The vibration power generator according to the embodiments of the present invention can generate power stably even when receiving external vibration in a low frequency range, as compared to the conventional vibration generator, and therefore is very useful as an electrostatic induction vibration power generator. The vibration power generator according to the embodiments of the present invention is preferably used for wireless communication modules with a small power consumption, and other electronic devices.

DESCRIPTION OF REFERENCE NUMERALS

100 Vibration power generator
102 First substrate
103 Second substrate
104L, 104R Third electrode
105L, 105R Fourth electrode
106a, 106b, 106c First electrode
107a, 107b, 107c Second electrode
108 Vibrational direction

The invention claimed is:

1. A vibration power generator comprising:
a first substrate;
a first electrode disposed over at least one surface of the first substrate;
a second substrate opposed to the first substrate with distance from the first substrate; and
a second electrode disposed over the second substrate to be opposed to the first electrode, wherein the first substrate is capable of vibrating with respect to the second substrate, any one of the first electrode and the second electrode comprises a film holding electric charge, the power can be generated with use of a change in overlapped area viewed in a direction perpendicular to surfaces with the first electrode and the second electrode formed thereover, which further comprises:

a third electrode disposed at each of both ends of the surface of the first substrate with the first electrode formed, in a vibrational direction of the first substrate, and a fourth electrode disposed at each of both ends of the surface of the second substrate with the second electrode formed, in the vibrational direction of the first substrate, wherein the third electrode and the fourth electrode comprise a film holding the electric charge with the same polarity, and wherein, in a cross section taken along in the vibrational direction of the first substrate, an angle formed between a segment connecting a centroid of the third electrode positioned at one end and a centroid of the fourth electrode positioned at the one end, and a half line extending from the centroid of the fourth electrode positioned at the one end toward the fourth electrode positioned at the other end in parallel to the main surface of the second substrate does not exceed 55 degrees while the first substrate is stationary and vibrates, and wherein another angle formed between a segment connecting a centroid of the third electrode positioned at the other end and a centroid of the fourth electrode positioned at the other end, and a half line extending from the centroid of the fourth electrode positioned at the other end toward the fourth electrode positioned at the one end in parallel to the main surface of the second substrate does not exceed 55 degrees while the first substrate is stationary and vibrates.

2. The vibration power generator according to claim 1 further comprising:

a first stopper formed at each of both sides of the first substrate in the vibrational direction;

a second stopper which is contactable with the first stopper; and a fixed structure, wherein the fixed structure is formed at the second substrate, and the second stopper is formed at the fixed structure, wherein when g is a distance between the first substrate and the second substrate and k is a distance between the centroids of the third electrode and the fourth electrode, a length kv that is a length of the distance k in the vibrational direction of the first substrate wherein k is a displacement distance of the first substrate until the first stopper is in contact with the second stopper, is equal to or more than g/tan 55°.

3. The vibration power generator according to claim 1 further comprising:

a stopper that is contactable with each of both sides of the first substrate in the vibrational direction; and a fixed structure, wherein the fixed structure is formed at the second substrate, and the stopper is formed at the fixed structure, wherein when g is a distance between the first substrate and the second substrate and k is a distance between the centroids of the third electrode and the fourth electrode, a length kv that is a length of the distance k in the vibrational direction of the first substrate wherein k is a displacement distance of the first substrate until either of both sides is in contact with the stopper, is equal to or more than g/tan 55°.

4. The vibration power generator according to claim 1 further comprising a fifth electrode disposed at each of both ends of the surface of the second substrate with the fourth electrode formed, in the vibrational direction of the first substrate, wherein the fifth electrode is formed on the center side of the second substrate with respect to the fourth electrode, and wherein the fifth electrode comprises a film holding the electric charge with the same polarity as that of each of the third and fourth electrodes.

5. The vibration power generator according to claim 4, wherein an angle formed between a segment connecting the centroid of the third electrode positioned at one end and the centroid of the fifth electrode positioned at the one end, and a half line extending from the centroid of the fifth electrode positioned at the one end toward the fourth electrode positioned at the one end in parallel to the main surface of the second substrate does not exceed 55 degrees while the first substrate is stationary and vibrates, and wherein another angle formed between a segment connecting the centroid of the fourth electrode positioned at the other end and the centroid of the fifth electrode positioned at the other end, and a half line extending from the centroid of the fifth electrode positioned at the other end toward the fourth electrode positioned at the other end in parallel to the main surface of the second substrate does not exceed 55 degrees while the first substrate is stationary and vibrates.

6. A vibration power generation apparatus comprising:

the vibration power generator according to claim 1; and a rectifying circuit for rectifying and converting an AC output voltage from the vibration power generator into a DC voltage.

7. The vibration power generation apparatus according to claim 6 further comprising:

a voltage conversion circuit for converting the DC voltage output from the rectifying circuit into a desired voltage level;

a storing circuit for storing power generated by the vibration power generator when an output from the vibration power generation apparatus is not required;

a voltage control circuit for controlling a voltage output from the voltage conversion circuit or the storing circuit to a predetermined voltage; and an output switching circuit for switching the output from the voltage conversion circuit between the storing circuit and the voltage control circuit.

8. A communication device which uses the vibration power generation apparatus according to claim 6.

9. An electronic device which uses the vibration power generation apparatus according to claim 6.

10. A communication device comprising the vibration power generator according to claim 1, and a battery.

11. An electronic device comprising the vibration power generator according to claim 1, and a battery.

* * * * *